US012664330B2

(12) United States Patent (10) Patent No.: US 12,664,330 B2
Yamamoto et al. (45) Date of Patent: Jun. 23, 2026

(54) INFORMATION PROCESSING SYSTEM AND SIMULATION METHOD

(71) Applicant: Tokyo Electron Limited, Tokyo (JP)

(72) Inventors: Masakazu Yamamoto, Iwate (JP);
Tadashi Enomoto, Iwate (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 285 days.

(21) Appl. No.: 17/175,744

(22) Filed: Feb. 15, 2021

(65) Prior Publication Data

US 2021/0264076 A1 Aug. 26, 2021

(30) Foreign Application Priority Data

Feb. 20, 2020 (JP) ................................ 2020-027142

(51) Int. Cl.
*G06F 30/20* (2020.01)
*G06F 119/18* (2020.01)

(52) U.S. Cl.
CPC .......... *G06F 30/20* (2020.01); *G06F 2119/18* (2020.01)

(58) Field of Classification Search
CPC ....... G06F 30/20; G06F 2119/18; H01L 21/02
USPC .......................................................... 703/13
See application file for complete search history.

(56) References Cited

U.S. PATENT DOCUMENTS 7,212,878 B2 * 5/2007 Funk ...................... H01L 22/20
700/121
8,014,991 B2 * 9/2011 Mitrovic ................. G06F 30/23
700/121

10,140,394 B2 * 11/2018 Kommisetti ............ G06F 30/20
11,144,701 B2 * 10/2021 Egan ...................... G06F 30/398
2002/0156542 A1 * 10/2002 Nandi .............. G05B 19/41865
700/30
2005/0071035 A1 * 3/2005 Strang .............. G05B 19/41885
700/121
2015/0045942 A1 * 2/2015 Koyama ............ G05B 19/4185
700/180

(Continued)

FOREIGN PATENT DOCUMENTS

JP 2004158820 A * 6/2004 ........... G11C 29/006
JP 2018-125451 A 8/2018

OTHER PUBLICATIONS

Model_Predictive_Control_2019 (Downloaded from Wikipedia Archive dated Dec. 16, 2019). (Year: 2019).*

(Continued)

*Primary Examiner* — Brian S Cook

(74) *Attorney, Agent, or Firm* — Venjuris, P.C.

(57) ABSTRACT

An information processing system includes: a physical sensor data acquisition unit configured to acquire physical sensor data measured by a semiconductor manufacturing apparatus that executes a process according to a process parameter; a simulation execution unit configured to execute a simulation by a simulation model of the semiconductor manufacturing apparatus according to the process parameter and calculate virtual sensor data and virtual process result data; and a display controller that visualizes a process state of the semiconductor manufacturing apparatus and displays the process state on a display unit during the execution of the process using the physical sensor data, the virtual sensor data, and the virtual process result data.

20 Claims, 21 Drawing Sheets

(56) References Cited

U.S. PATENT DOCUMENTS

2017/0193400 A1* 7/2017 Bhaskar ................. G01Q 30/02

OTHER PUBLICATIONS

Kano_2010 (Detection of Significant Model-Plant Mismatch from Routine Operation Data of Model Predictive Control System, Proceedings of the 9th International Symposium on Dynamics and Control of Process Systems, 2010). (Year: 2010).*

* cited by examiner

*FIG. 3*

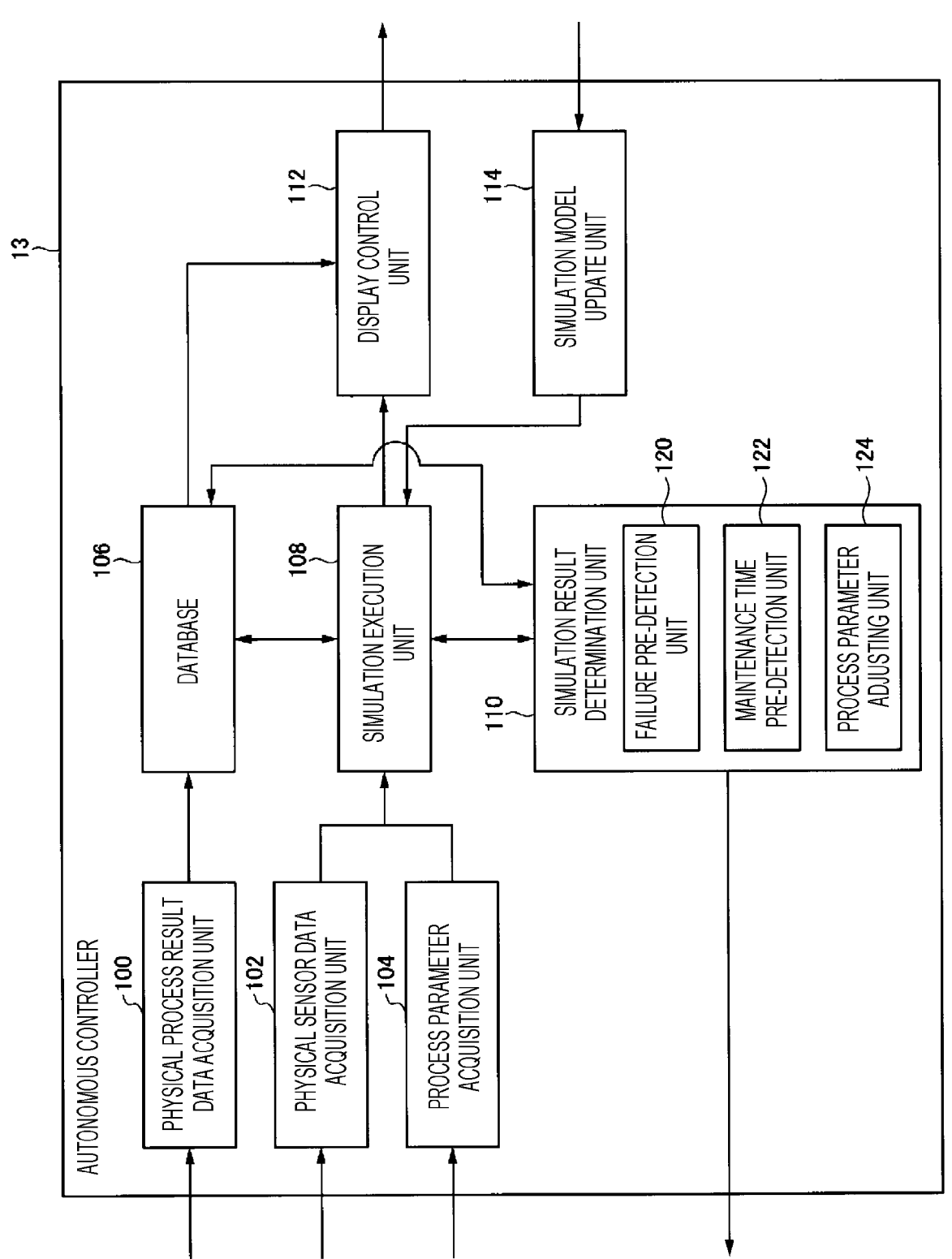

AUTONOMOUS CONTROLLER 13

100 PHYSICAL PROCESS RESULT DATA ACQUISITION UNIT

102 PHYSICAL SENSOR DATA ACQUISITION UNIT

104 PROCESS PARAMETER ACQUISITION UNIT

106 DATABASE

108 SIMULATION EXECUTION UNIT

110 SIMULATION RESULT DETERMINATION UNIT

120 FAILURE PRE-DETECTION UNIT

122 MAINTENANCE TIME PRE-DETECTION UNIT

124 PROCESS PARAMETER ADJUSTING UNIT

112 DISPLAY CONTROL UNIT

114 SIMULATION MODEL UPDATE UNIT

HEATER

OUTER PIPE

INNER PIPE

GAS SUPPLY PIPE

ELEVATING
MECHANISM

GAS SUPPLY

WAFER BOAT

WAFER

INNER TEMPERATURE
SENSOR

OUTER TEMPERATURE
SENSOR

INSULATING
CYLINDER

MANIFOLD

EXHAUST PORT

*FIG. 15*

INFORMATION PROCESSING SYSTEM AND SIMULATION METHOD

CROSS-REFERENCE TO RELATED APPLICATION

This application is based on and claims priority from Japanese Patent Application No. 2020-027142 filed on Feb. 20, 2020 with the Japan Patent Office, the disclosure of which is incorporated herein in its entirety by reference.

TECHNICAL FIELD

The present disclosure relates to an information processing system and a simulation method.

BACKGROUND

A process simulation is used in the field of semiconductor product manufacturing or research and development. The process simulation may handle various physical phenomena related to a semiconductor process (hereinafter, referred to as a process) using a physical model (see, e.g., Japanese Patent Laid-Open Publication No. 2018-125451).

For example, in the process simulation, the process state during the process execution (e.g., method for attaching a wafer film, temperature state, and gas state) is estimated from the measurement results after the process is executed.

SUMMARY

According to an embodiment of the present disclosure, an information processing system executes a simulation of a process state being executed by a semiconductor manufacturing apparatus using a simulation model of the semiconductor manufacturing apparatus. The information processing system includes: a physical sensor data acquisition unit configured to acquire physical sensor data measured by the semiconductor manufacturing apparatus that executes a process according to a process parameter; a simulation execution unit configured to execute a simulation by the simulation model according to the process parameter and calculate virtual sensor data and virtual process result data; and a display controller that visualizes the process state of the semiconductor manufacturing apparatus and displays the process state on a display during the execution of the process using the physical sensor data, the virtual sensor data, and the virtual process result data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 3 is a functional block diagram of an example of an autonomous controller according to the present embodiment.

FIG. 15 is an explanatory diagram of an example in which a temperature category is extracted from a process of creating and updating a temperature-related simulation model.

DETAILED DESCRIPTION

In the following detailed description, reference is made to the accompanying drawing, which form a part thereof. The illustrative embodiments described in the detailed description, drawing, and claims are not meant to be limiting. Other embodiments may be utilized, and other changes may be made without departing from the spirit or scope of the subject matter presented here.

Hereinafter, embodiments for carrying out the present disclosure will be described with reference to the accompanying drawings.

<System Configuration>

Figure 1:
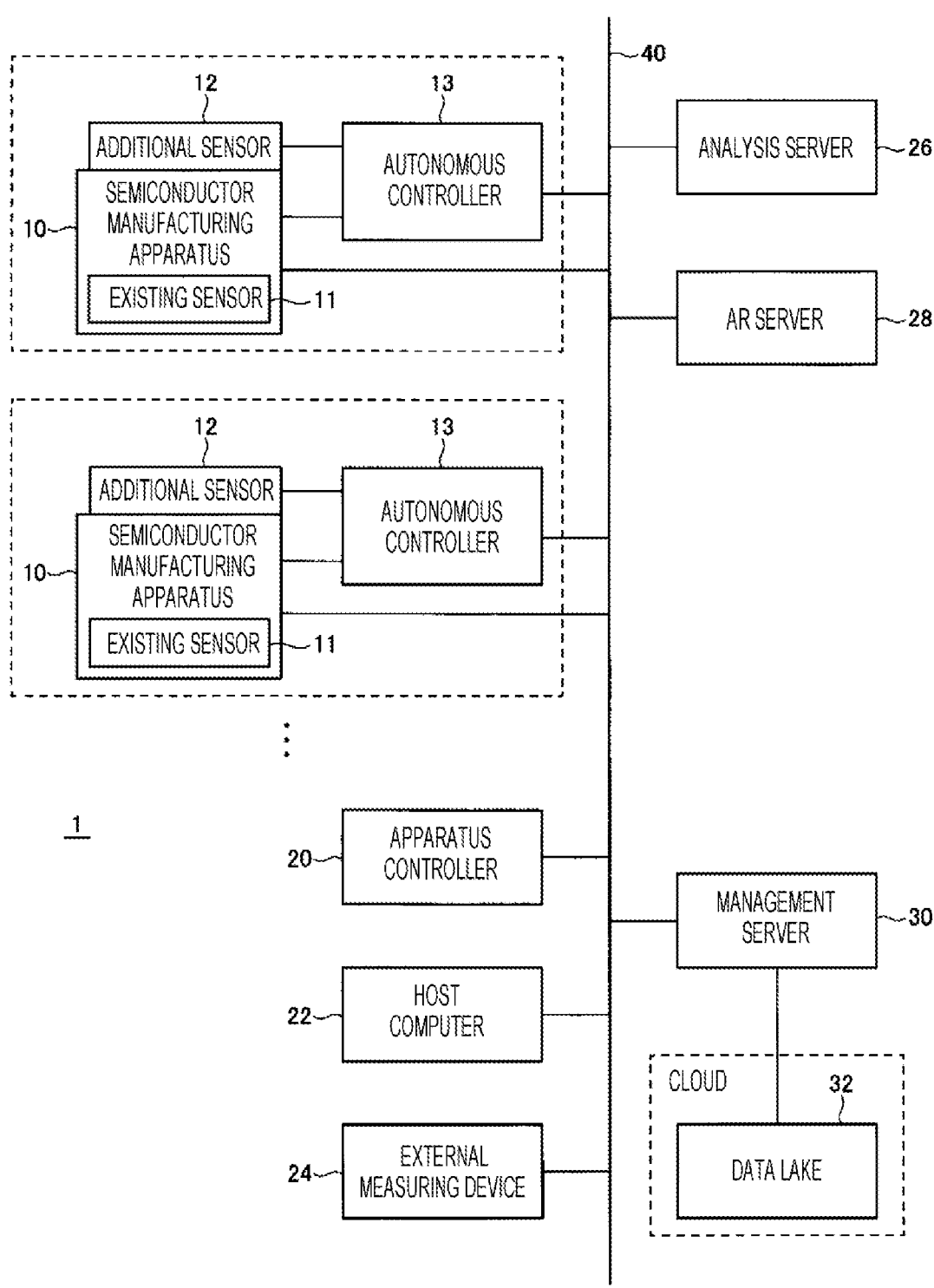
FIG. 1 is a configuration diagram of an example of an information processing system according to the present embodiment.

FIG. 1 is a configuration diagram of an example of an information processing system according to the present embodiment. The information processing system 1 illustrated in FIG. 1 includes a semiconductor manufacturing apparatus 10, an existing sensor 11, an additional sensor 12, an autonomous controller 13, an apparatus controller 20, a host computer 22, an external measuring device 24, an analysis server 26, an AR server 28, a management server 30, and a data lake 32.

The semiconductor manufacturing apparatus 10, the autonomous controller 13, the apparatus controller 20, the host computer 22, the external measuring device 24, the analysis server 26, the AR server 28, and the management server 30 are connected to enable communication via a network 40 such as a local area network (LAN).

The semiconductor manufacturing apparatus 10 is, for example, a heat treatment film forming apparatus, and executes a process according to a control command (process parameter) output from the apparatus controller 20. The semiconductor manufacturing apparatus 10 is mounted with a plurality of existing sensors 11. The existing sensor 11 is an example of a physical sensor that measures temperature or pressure as physical sensor data. The additional sensor 12 is an example of a physical sensor mounted for confirming the accuracy of the virtual sensor data described later. The virtual sensor data is calculated based on the simulation model (physical model) described later. Since the additional sensor 12 is mounted to confirm the accuracy of the virtual sensor data calculated based on the simulation model, it does not have to be mounted in the final product shipped to the customer. The additional sensor 12 measures temperature or pressure as physical sensor data.

The autonomous controller 13 is a controller for autonomously controlling the semiconductor manufacturing apparatus 10, and as described later, performs a simulation of the process state being executed by the semiconductor manufacturing apparatus 10 using the simulation model, an optimization of process parameters, a pre-detection of failure, and a pre-detection of maintenance time. The autonomous controller 13 is provided for each semiconductor manufacturing apparatus 10. By executing the simulation using the simulation model described later, the autonomous controller 13 calculates the state of film adhesion on the wafer, the temperature of the wafer, the gas, and the plasma as the result after executing the process according to the process parameters. The data (virtual data) calculated by executing the simulation using the simulation model described later includes virtual sensor data and virtual process result data. The virtual sensor data is output from the virtual sensor. The virtual process result data is other than the virtual sensor data among the data included in the virtual data.

The apparatus controller 20 is a controller having a computer configuration for controlling the semiconductor manufacturing apparatus 10. The apparatus controller 20 outputs process parameters optimized as described later to the semiconductor manufacturing apparatus 10 as process parameters for controlling the control components of the semiconductor manufacturing apparatus 10.

The host computer 22 is an example of a man-machine interface (MMI) that receives an instruction to the semiconductor manufacturing apparatus 10 from an operator and provides information on the semiconductor manufacturing apparatus 10 to the operator.

The external measuring device 24 is a measuring device such as a film thickness measuring device, a sheet resistance measuring device, and a particle measuring device that measures the result after execution of the process according to the process parameters. For example, the external measuring device 24 measures the state of film adhesion on a wafer such as a monitor wafer. Hereinafter, the data measured by the external measuring device 24 will be referred to as physical process result data.

As will be described later, the analysis server 26 updates the simulation model, analyzes data for optimizing process parameters, and performs a data analysis for failure pre-detection and maintenance time pre-detection. The AR server 28 uses augmented reality (AR) technology to display a screen of the result of a simulation of a process state being executed by the semiconductor manufacturing apparatus 10 and a screen for work support such as maintenance.

The management server 30 manages information about a plurality of semiconductor manufacturing apparatuses 10 of, for example, one or more companies stored in a data storage area such as a data lake 32 (process parameters for executing a process in the semiconductor manufacturing apparatus 10, physical sensor data when the process is executed according to the process parameters, physical process result data, and the like). By editing the simulation model as described later based on the information about the plurality of semiconductor manufacturing apparatuses 10, the base simulation model may be edited (corrected) based on the behavior of the plurality of semiconductor manufacturing apparatuses 10. The base of the simulation model is the greatest common divisor model based on the plurality of semiconductor manufacturing apparatuses 10.

The base of the simulation model is edited to fit each semiconductor manufacturing apparatus 10 by, for example, deep learning. This editing is executed, for example, every time the semiconductor manufacturing apparatus 10 is operated, and as the semiconductor manufacturing apparatus 10 is operated more, the prediction accuracy of the simulation model in each semiconductor manufacturing apparatus 10 becomes higher.

Further, the information processing system 1 in FIG. 1 is an example, and it is needless to say that there are various system configuration examples depending on the application and purpose. The classification of devices such as the semiconductor manufacturing apparatus 10, the autonomous controller 13, the apparatus controller 20, the host computer 22, the external measuring device 24, the analysis server 26, the AR server 28, and the management server 30 in FIG. 1 is an example.

For example, in the information processing system 1, at least two of the semiconductor manufacturing apparatus 10, the autonomous controller 13, the apparatus controller 20, the host computer 22, the external measuring device 24, the analysis server 26, the AR server 28, and the management server 30 are integrated. However, the information processing system 1 may have various configurations such as a further divided configuration. Further, the analysis server 26 and the AR server 28 may be able to handle a plurality of semiconductor manufacturing apparatuses 10 collectively as in the information processing system 1 of FIG. 1, or may be provided one-to-one with the semiconductor manufacturing apparatus 10. The analysis server 26 and the AR server 28 provided one-to-one with the semiconductor manufacturing apparatus 10 may perform a process specialized for the corresponding semiconductor manufacturing apparatus 10.

<Hardware Configuration>

Figure 2:
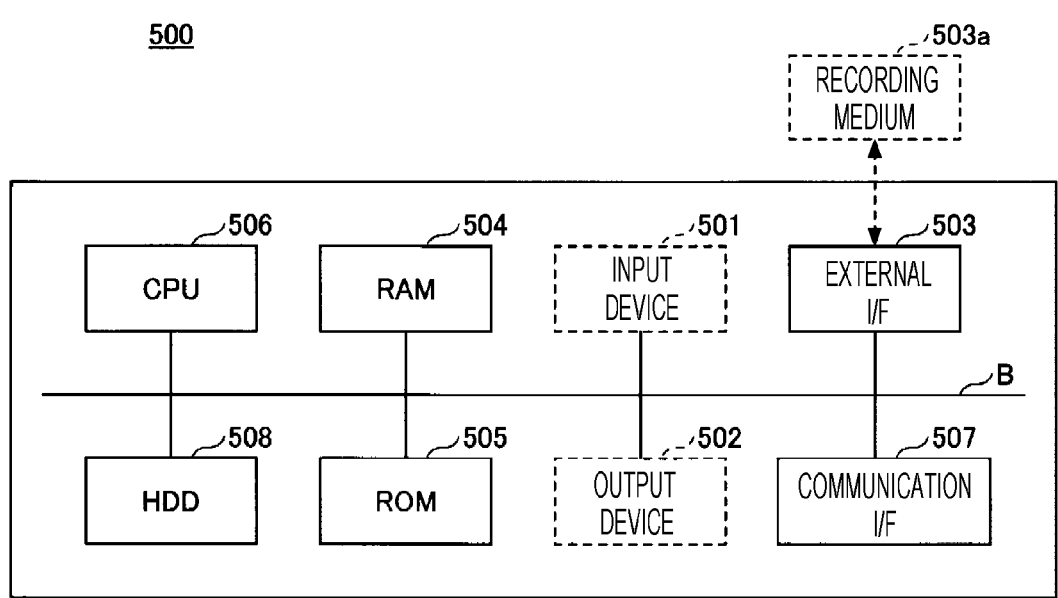
FIG. 2 is a hardware configuration diagram of an example of a computer.

The autonomous controller 13, the apparatus controller 20, the host computer 22, the analysis server 26, the AR server 28, and the management server 30 of the information processing system 1 illustrated in FIG. 1 are implemented by, for example, a computer having a hardware configuration as illustrated in FIG. 2. FIG. 2 is a hardware configuration diagram of an example of a computer.

The computer 500 of FIG. 2 includes an input device 501, an output device 502, an external interface (I/F) 503, a random access memory (RAM) 504, a read only memory (ROM) 505, a central processing unit (CPU) 506, and a communication I/F 507, and a hard disk drive (HDD) 508, and the respective elements are connected to each other via a bus B. The input device 501 and the output device 502 may be connected and used when necessary.

The input device 501 is a keyboard, a mouse, or a touch panel, and is used by an operator to input each operation signal. The output device 502 is a display or the like, and displays the processing result by the computer 500. The communication I/F 507 is an interface for connecting the computer 500 to the network. The HDD 508 is an example of a non-volatile storage device that stores programs and data.

The external I/F 503 is an interface with an external device. The computer 500 may read and/or write to a recording medium 503a such as an SD (Secure Digital) memory card via the external I/F 503. The ROM 505 is an example of a non-volatile semiconductor memory (storage device) in which programs and data are stored. The RAM 504 is an example of a volatile semiconductor memory (storage device) that temporarily holds programs and data.

The CPU 506 is an arithmetic unit that implements control and functions of the entire computer 500 by reading a program or data from a storage device such as the ROM 505 or the HDD 508 onto the RAM 504 and executing processing.

The autonomous controller 13, the apparatus controller 20, the host computer 22, the analysis server 26, the AR server 28, and the management server 30 of FIG. 1 may implement various functions by the hardware configuration of the computer in FIG. 2.

<Functional Configuration>

The autonomous controller 13 of the information processing system 1 according to the present embodiment is implemented by, for example, the functional block of FIG. 3. FIG. 3 is a functional block diagram of an example of the autonomous controller according to the present embodiment. Further, the functional block diagram of FIG. 3 omits the illustration of a configuration unnecessary for the description of the present embodiment.

By executing the program for the autonomous controller 13, the autonomous controller 13 implements a physical process result data acquisition unit 100, a physical sensor data acquisition unit 102, a process parameter acquisition unit 104, a database 106, a simulation execution unit 108, a simulation result determination unit 110, a display control unit 112, and a simulation model update unit 114. Further, the simulation result determination unit 110 has a configuration including a failure pre-detection unit 120, a maintenance time pre-detection unit 122, and a process parameter adjusting unit 124.

The physical process result data acquisition unit 100 acquires the physical process result data which is a result after executing the process according to the process parameters, and stores such data in the database 106.

The physical sensor data acquisition unit 102 acquires physical sensor data measured by the existing sensor 11 and the additional sensor 12 and provides the acquired data to the simulation execution unit 108. The process parameter acquisition unit 104 acquires the process parameters of the process being executed by the semiconductor manufacturing apparatus 10 and provides the acquired process parameters to the simulation execution unit 108. The database 106 is a data storage area in which data used by the simulation execution unit 108 for simulation, and data used by the analysis server 26 for updating the simulation model and analyzing the data are stored.

The simulation execution unit 108 may calculate the process state of the semiconductor manufacturing apparatus 10 in which the process is being executed by executing the simulation by the simulation model according to the same process parameters as the semiconductor manufacturing apparatus 10 in which the process is being executed.

As for the simulation model of the semiconductor manufacturing apparatus 10 used by the simulation execution unit 108 for the simulation, for example, a simulation model of 1DCAE may be used. The simulation model of 1DCAE enables the evaluation analysis before the structural design (3DCAE) by expressing the entire semiconductor manufacturing apparatus 10 on the function basis in the functional design which is an upstream design.

The simulation result determination unit 110 uses the physical process result data, physical sensor data, virtual process result data, and virtual sensor data based on the same process parameters, thereby performing a failure pre-detection by the failure pre-detection unit 120, and a maintenance time pre-detection by the maintenance time pre-detection unit 122 as described later. Further, the simulation result determination unit 110 optimizes the process parameters by the process parameter adjusting unit 124 as described later.

The display control unit 112 uses the virtual process result data and the virtual sensor data by the simulation executed according to the same process parameters as the semiconductor manufacturing apparatus 10 while executing the process in the semiconductor manufacturing apparatus 10, thereby visualizing the process state of the semiconductor manufacturing apparatus 10 executing the process in real time and displaying the process state on, for example, the host computer 22.

Therefore, the display control unit 112 may implement a so-called digital twin that reproduces the change in the physical space of the process state of the semiconductor manufacturing apparatus 10 executing the process in the virtual space with real-time interlocking. In the digital twin, the process state of the semiconductor manufacturing apparatus 10 may be reproduced in real time in the virtual space while the process is executed by the semiconductor manufacturing apparatus 10.

By using such a digital twin environment, in addition to being able to monitor the process state of the semiconductor manufacturing apparatus 10, the simulation result determination unit 110 may perform a failure pre-detection, a maintenance time pre-detection, and a process parameter adjustment, which will be described later.

The simulation model update unit 114 updates the simulation model used by the simulation execution unit 108 for simulating the process state to the simulation model edited by the analysis server 26.

Figure 4:
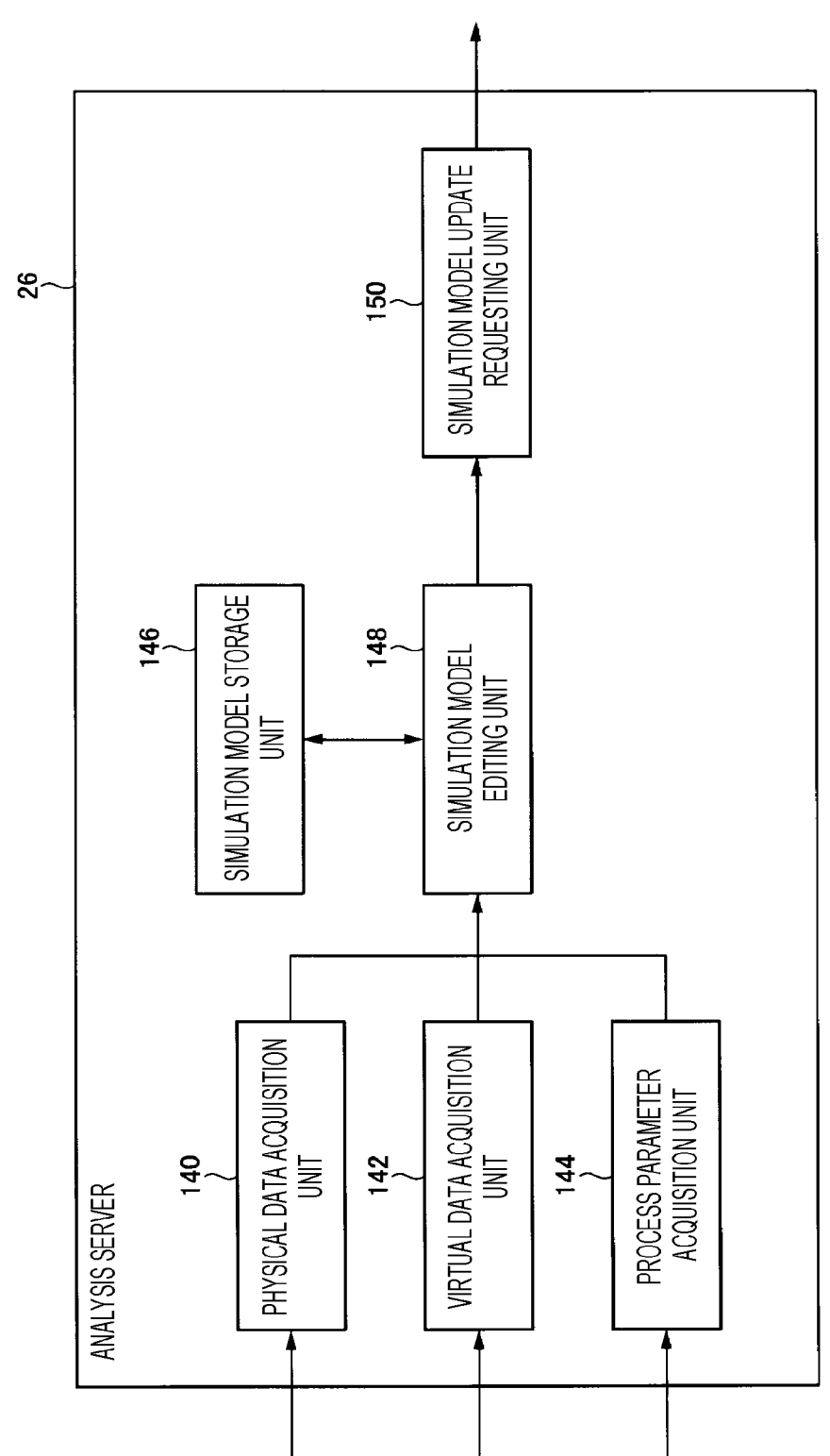
FIG. 4 is a functional block diagram of an example of an analysis server according to the present embodiment.

Further, the analysis server 26 of the information processing system 1 according to the present embodiment is implemented by, for example, the functional block of FIG. 4. FIG. 4 is a functional block diagram of an example of the analysis server according to the present embodiment. Further, the functional block diagram of FIG. 4 omits the illustration of a configuration unnecessary for the description of the present embodiment.

By executing the program for the analysis server 26, the analysis server 26 implements the physical data acquisition unit 140, the virtual data acquisition unit 142, the process parameter acquisition unit 144, the simulation model storage unit 146, the simulation model editing unit 148, and the simulation model update requesting unit 150.

The physical data acquisition unit 140 acquires the physical sensor data and the physical process result data of the semiconductor manufacturing apparatus 10 to be analyzed from the autonomous controller 13 or the management server 30 as physical data, and provides such data to the simulation model editing unit 148.

The virtual data acquisition unit 142 acquires the virtual sensor data and the virtual process result data of the semiconductor manufacturing apparatus 10 to be analyzed from the autonomous controller 13 or the management server 30 as virtual (Cyber) data, and provides such data to the simulation model editing unit 148.

The process parameter acquisition unit 144 acquires the process parameters of the semiconductor manufacturing apparatus 10 to be analyzed from the autonomous controller 13 or the management server 30, and provides such parameters to the simulation model editing unit 148.

The simulation model storage unit 146 stores a simulation model for the simulation execution unit 108 of the autonomous controller 13 to use for simulating the process state of the semiconductor manufacturing apparatus 10. The simulation model editing unit 148 edits the simulation model by using the provided physical data, virtual data, and process parameters, for example, by using machine learning so that the difference between the physical data and virtual data due to the same process parameters becomes smaller (becomes the optimum simulation model). Further, editing of the simulation model does not necessarily have to be performed during normal operation of the semiconductor manufacturing apparatus 10, and may be performed, for example, when a physical specification change is made to the semiconductor manufacturing apparatus 10 to be simulated. The simulation model update requesting unit 150 requests the autonomous controller 13 to update the edited simulation model.

<Process>

<<Advance Preparation>>

In the information processing system 1 according to the present embodiment, for example, a simulation model edited by machine learning is used so that the difference between the physical data of the semiconductor manufacturing apparatus 10 that executes the process according to the process parameters and the virtual data of the simulation executed according to the same process parameters as the semiconductor manufacturing apparatus 10 becomes smaller.

By using such a simulation model, the information processing system 1 according to the present embodiment ensures the certainty of the result of the simulation using the simulation model. Further, the simulation model may be edited according to the elapsed time from the previous editing, the number of process executions, and the expansion of the difference between the physical data and the virtual data according to the same process parameters.

<<Process Execution>>

Figure 5:
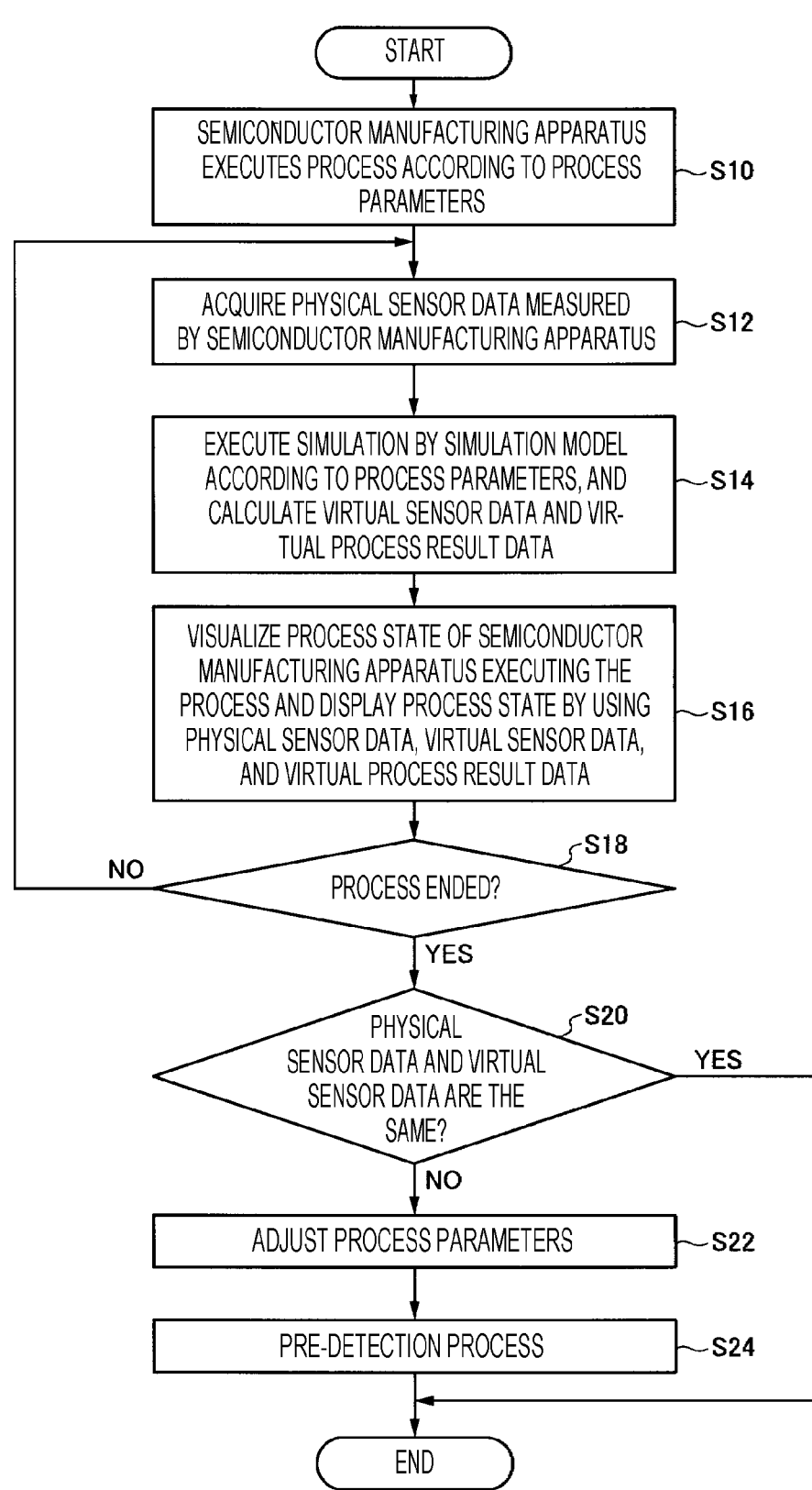
FIG. 5 is a flowchart of an example of a process of the information processing system according to the present embodiment.

FIG. 5 is a flowchart of an example of a process of the information processing system according to the present embodiment. The semiconductor manufacturing apparatus 10 executes the process in step S10 according to the process parameters output from the apparatus controller 20. In step S12, the autonomous controller 13 acquires the physical sensor data measured by the existing sensor 11 and the additional sensor 12 from the semiconductor manufacturing apparatus 10 that is executing the process.

In step S14, the simulation execution unit 108 of the autonomous controller 13 executes the simulation by the simulation model according to the same process parameters as the semiconductor manufacturing apparatus 10 executing the process, and calculates the virtual sensor data and the virtual process result data.

Figure 6:
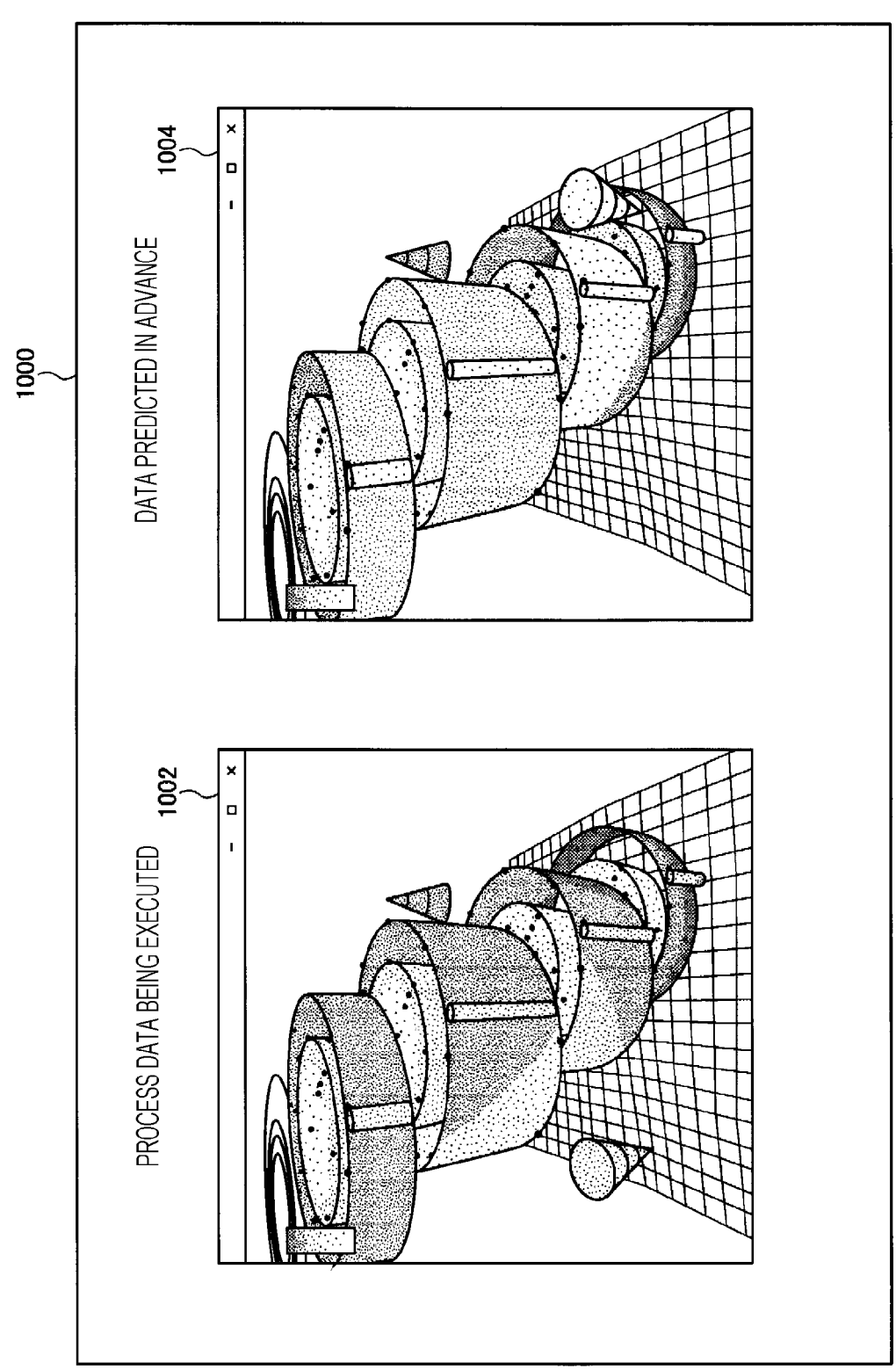
FIG. 6 is an image diagram of an example of a temperature evaluation screen.

In step S16, the display control unit 112 of the autonomous controller 13 may visualize the process state of the semiconductor manufacturing apparatus 10 executing the process as illustrated in FIG. 6 and display the process state on the host computer 22 by using the physical sensor data of the semiconductor manufacturing apparatus 10 in which the process is being executed, the virtual process result data by the simulation executed according to the same process parameters as the semiconductor manufacturing apparatus 10, and the virtual sensor data.

FIG. 6 is an image diagram of an example of a temperature evaluation screen. The temperature evaluation screen 1000 of FIG. 6 is a screen example in which the temperature display screen 1002 of the process being executed and the temperature display screen 1004 predicted in advance before the execution of the process are displayed at the same time.

In addition, the temperature evaluation screen 1000 of FIG. 6 is an example, and the temperature display screen based on the result of the simulation executed according to the process parameters before optimization and the temperature display screen based on the result of the simulation executed according to the process parameters after optimization may be displayed at the same time. As a result, the operator may confirm the degree of improvement by optimizing the process parameters. Further, the temperature evaluation screen 1000 of FIG. 6 may be a screen in which the temperature display screen of the process being executed and the predicted future temperature display screen are displayed at the same time.

The temperature display screens 1002 and 1004 of FIG. 6 display the temperature, virtual airflow, and convection of each part such as a wafer, an inner pipe, an outer pipe, an inner temperature sensor, and an outer temperature sensor. The temperature display screens 1002 and 1004 of FIG. 6 display the distribution of temperature and gas concentration in color. The temperature display screens 1002 and 1004 of FIG. 6 may be displayed at 360 degrees from various viewpoints. The temperature display screens 1002 and 1004 of FIG. 6 illustrate an example of a screen in which a necessary portion may be displayed by cutting into round slices. Further, unnecessary portions may be hidden.

Figure 7:
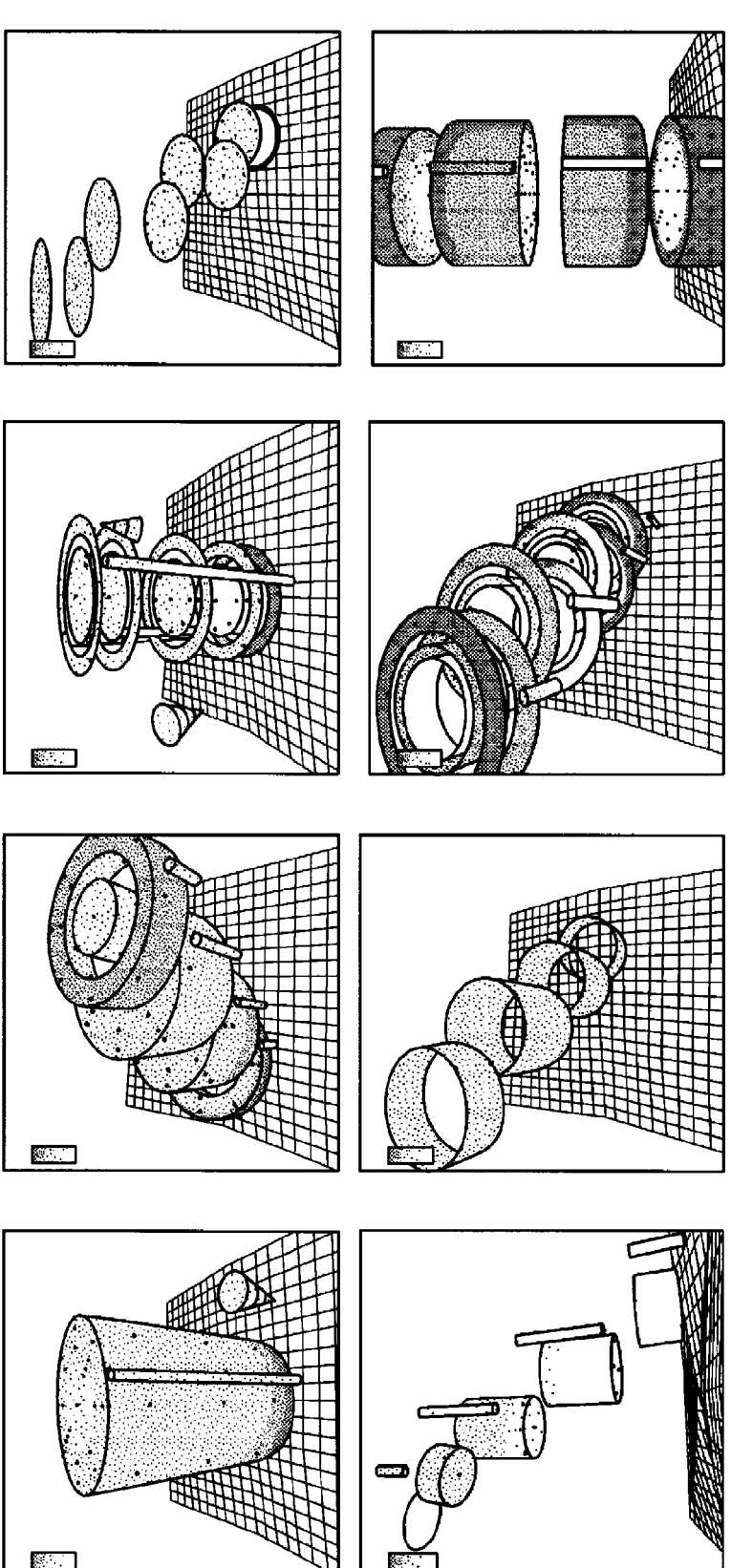
FIG. 7 is a diagram illustrating a screen example of a temperature display screen.

The temperature display screens 1002 and 1004 of FIG. 6 display the temperature measurement points by the physical sensor or the virtual sensor as black dots. The temperature display screens 1002 and 1004 of FIG. 6 may display the temperature at a position clicked by the operator with a mouse (a position where the operator wants to know the temperature). The temperature display screens 1002 and 1004 of FIG. 6 are examples, and for example, the temperature display screens of the form illustrated in FIG. 7 may be displayed. FIG. 7 is a diagram illustrating a screen example of the temperature display screen.

Figure 8:
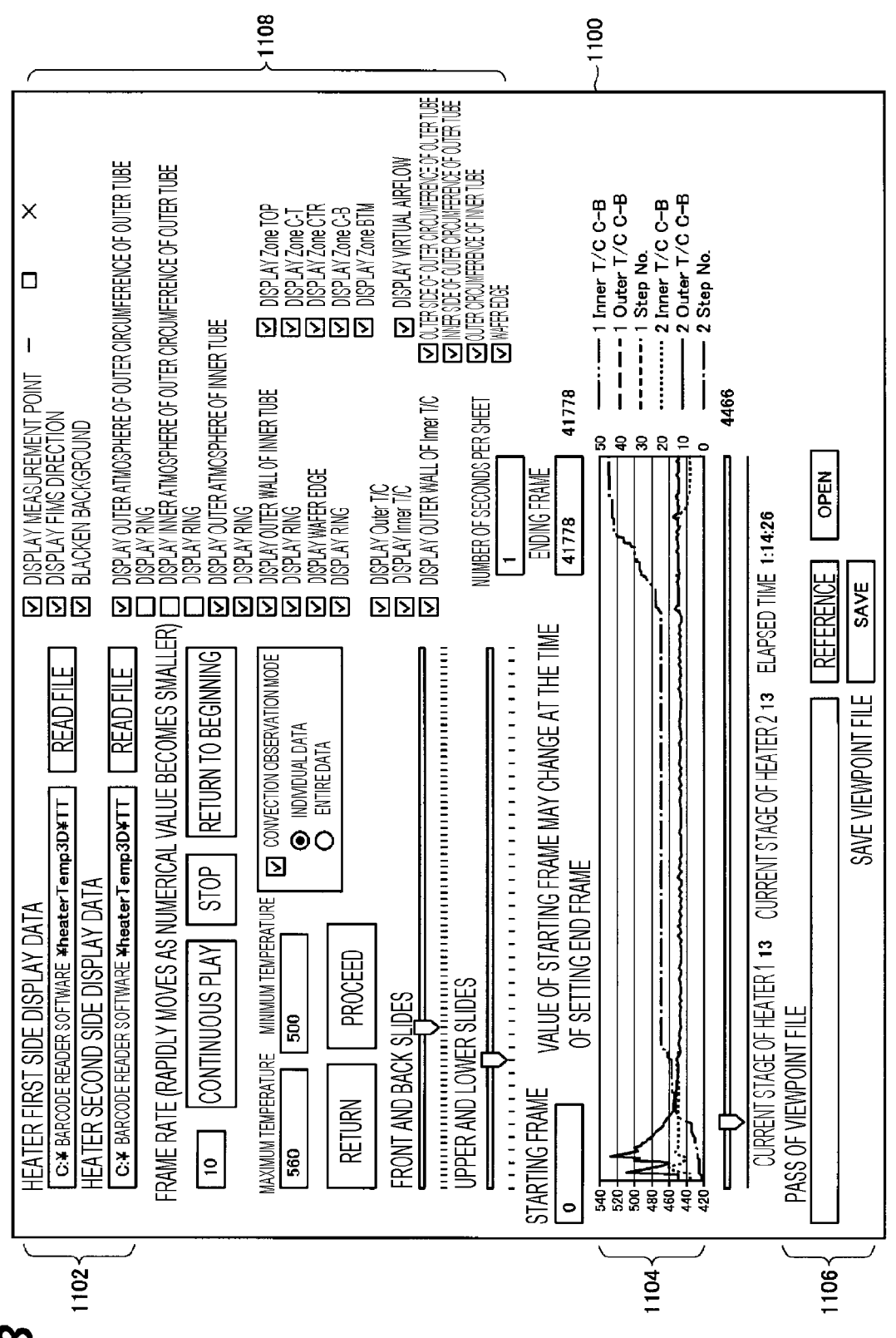
FIG. 8 is an image diagram of an example of an operation screen for operating the temperature evaluation screen.

The temperature display screens 1002 and 1004 displayed on the temperature evaluation screen 1000 of FIG. 6 may be operated from the operation screen 1100, for example, as illustrated in FIG. 8. FIG. 8 is an image diagram of an example of an operation screen for operating the temperature evaluation screen.

The operation screen 1100 of FIG. 8 may read a specified file such as a file of past data by designating the file in a file designation field 1102 and clicking a file read button, and may display the temperature display screens 1002 and 1004 by the read file. Further, the operation screen 1100 of FIG. 8 is an example in which the temperature display screens 1002 and 1004 by the read file may be displayed by designating an arbitrary time in the past by a frame.

In the operation screen 1100 of FIG. 8, a file of data of the semiconductor manufacturing apparatus 10 in which the process is being executed may be designated in the file designation field 1102. Further, the operation screen 1100 of FIG. 8 illustrates a screen example including a column 1104 for displaying data in a graph, a column 1106 for loading/saving a viewpoint file of 3D, and a column 1108 for setting display/non-display of information.

Referring back to step S18 of FIG. 5, the autonomous controller 13 repeats the processes of steps S12 to S16 until the process being executed by the semiconductor manufacturing apparatus 10 is completed. When the process being executed by the semiconductor manufacturing apparatus 10 is completed, the process proceeds from steps S18 to S20, and the simulation result determination unit 110 of the autonomous controller 13 compares the physical sensor data and the virtual sensor data at the same position and time, and determines whether the physical sensor data and the virtual sensor data at the same position and time are the same.

When it is determined that the physical sensor data and the virtual sensor data are not the same, the simulation result determination unit 110 performs the process parameter adjusting process of step S22 for optimizing the process parameters so that the result after the process execution requested by the customer may be obtained.

In the process parameter adjusting process of step S22, for example, when the difference between the physical sensor data and the virtual sensor data at the same position and time exceeds a predetermined threshold value, the optimization of the process parameters may be stopped, and the simulation model may be edited or the semiconductor manufacturing apparatus 10 may be maintained.

Proceeding to step S24, the simulation result determination unit 110 performs a failure pre-detection by the failure pre-detection unit 120, and a maintenance time pre-detection by the maintenance time pre-detection unit 122, as will be described later. When it is determined that the physical sensor data and the virtual sensor data are the same, the simulation result determination unit 110 skips the process parameter adjusting process in step S22 and the pre-detection process in step S24.

According to the process of the flowchart of FIG. 5, for example, until the difference between the physical sensor data and the virtual sensor data at the same position and time exceeds a predetermined threshold value, it is possible to obtain the result after the process execution requested by the customer by optimizing the process parameters.

Meanwhile, when the difference between the physical sensor data and the virtual sensor data at the same position and time exceeds a predetermined threshold value, it is possible to obtain the result after the process execution requested by the customer by editing the simulation model or dealing with the failure and maintenance time detected by the pre-detection process in step S24.

Figure 9:
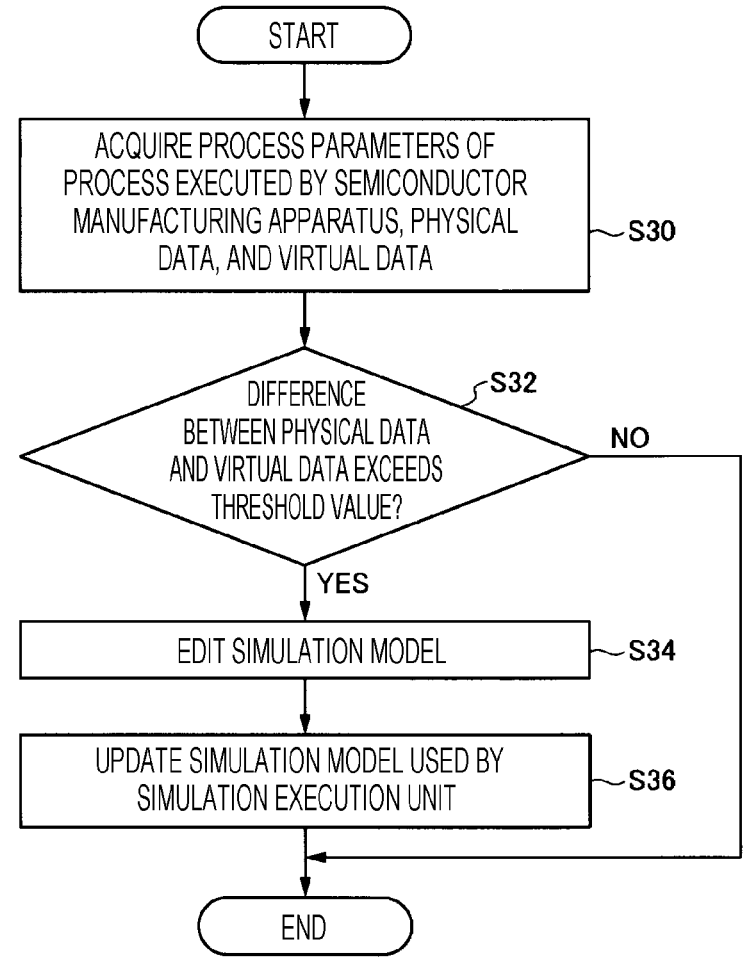
FIG. 9 is a flowchart of an example of a process for editing a simulation model.

Editing of the simulation model is executed by the processing procedure, for example, as illustrated in FIG. 9. FIG. 9 is a flowchart of an example of the process of editing the simulation model. In step S30, the analysis server 26 acquires the process parameters of the process executed by the semiconductor manufacturing apparatus 10, the physical data of the semiconductor manufacturing apparatus 10 which is the result of the process executed according to the process parameters, and the virtual data calculated based on the simulation model.

In step S32, the simulation model editing unit 148 of the analysis server 26 determines whether the difference between the physical sensor data and the virtual sensor data at the same position and time exceeds a predetermined threshold value. When it is determined that the threshold value is not exceeded, the simulation model editing unit 148 skips the processes of steps S34 to S36.

When it is determined that the threshold value is exceeded, in step S34, the simulation model editing unit 148 edits the simulation model by using the physical data, virtual data, and process parameters acquired in step S30, for example, by using machine learning or statistical processing so that the difference between the physical data and virtual data due to the same process parameters becomes smaller.

Proceeding to step S36, the simulation model update requesting unit 150 of the analysis server 26 requests the autonomous controller 13 to update the simulation model edited in step S34, so that the simulation used by the simulation execution unit 108 of the autonomous controller 13 may be updated.

Further, in the case of the base simulation model, the physical data, virtual data, and process parameters of the plurality of semiconductor manufacturing apparatuses 10 may be acquired, and the simulation model may be edited by using, for example, machine learning or statistical processing.

Figure 10:
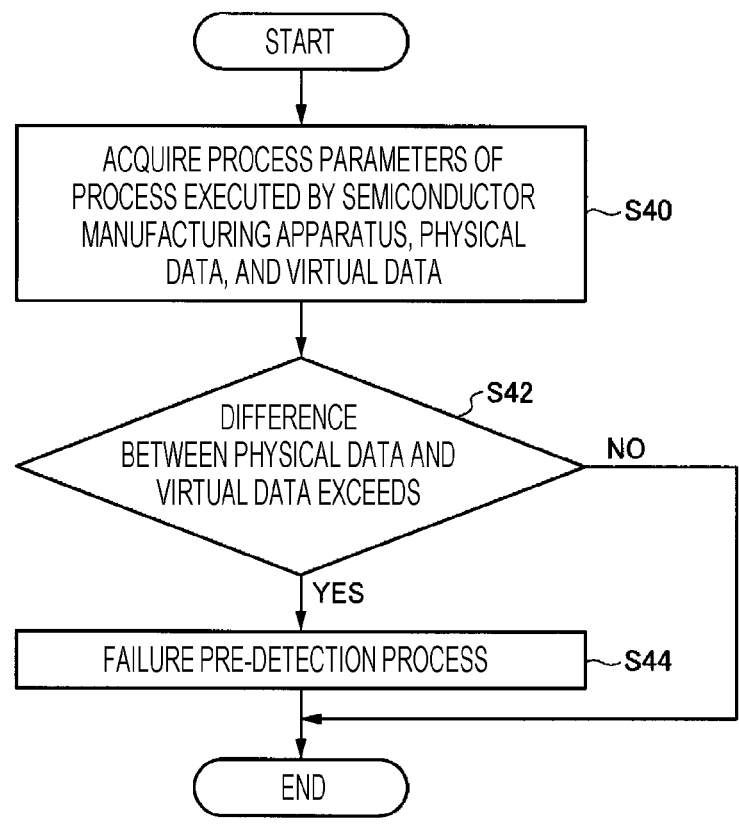
FIG. 10 is a flowchart of an example of a process for performing a failure pre-detection.
Figure 11:
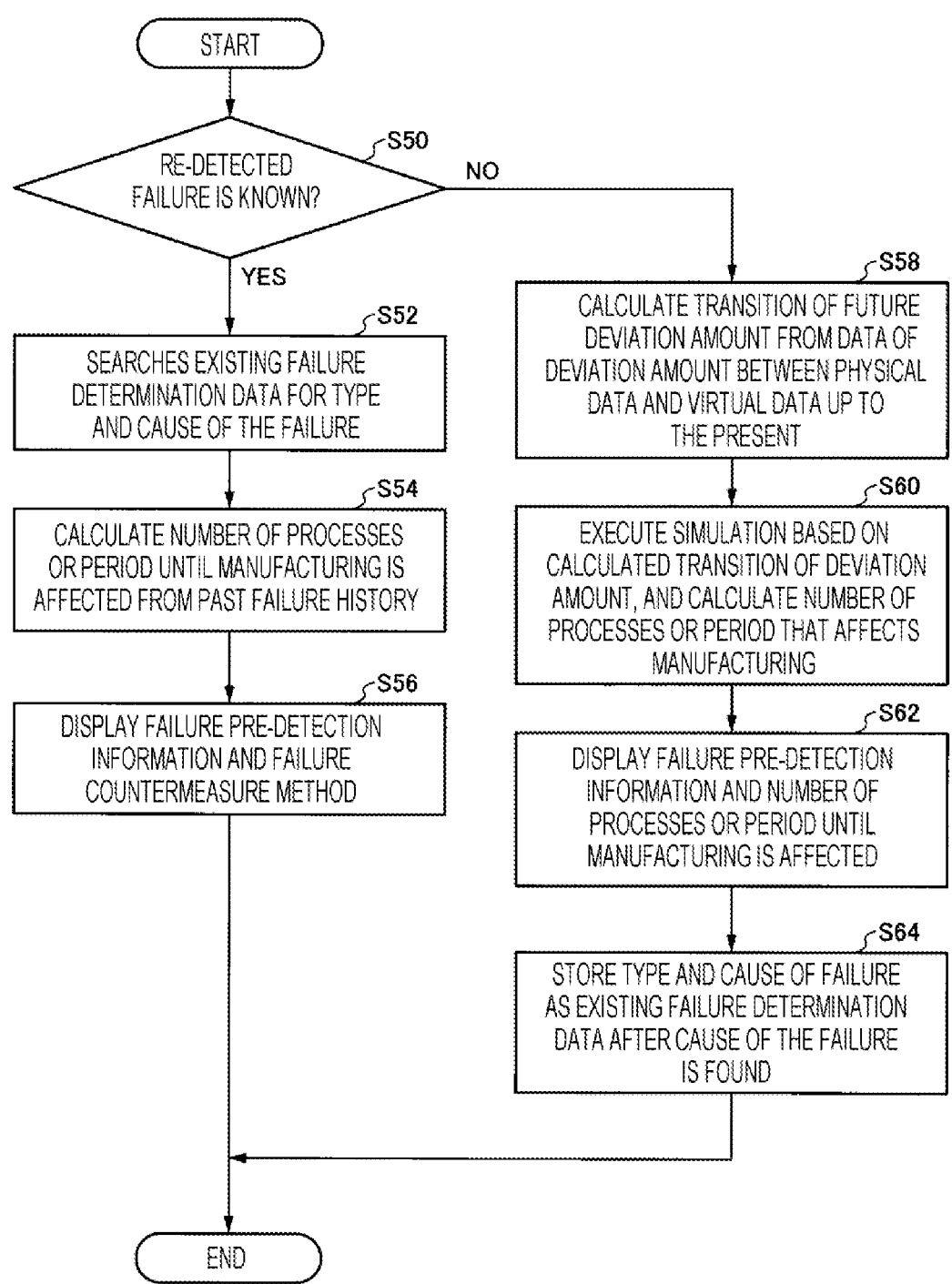
FIG. 11 is a flowchart of an example of a process for performing a failure pre-detection.

The failure pre-detection illustrated in step S24 of FIG. 5 is executed by, for example, the processing procedure illustrated in FIGS. 10 and 11. FIGS. 10 and 11 are flowcharts of an example of the process of performing the failure pre-detection.

In step S40, the failure pre-detection unit 120 of the autonomous controller 13 acquires the process parameters of the process executed by the semiconductor manufacturing apparatus 10, the physical data of the semiconductor manufacturing apparatus 10 which is the result of the process executed according to the process parameters, and the virtual data for the next and subsequent processes calculated based on the simulation model. Virtual data for the next and subsequent processes may be acquired by executing the next and subsequent virtual processes based on the simulation model. In this way, the virtual data calculated based on the simulation model may be acquired not only for the next process but also for a plurality of processes in consideration of the maintenance cycle. In step S42, the failure pre-detection unit 120 determines whether the difference between the physical sensor data and the virtual sensor data at the same position and time exceeds a predetermined threshold value.

When it is determined that the threshold value is not exceeded, the failure pre-detection unit 120 skips the failure pre-detection process in step S44. When it is determined that the threshold value is exceeded, the failure pre-detection unit 120 pre-detects it as a failure. In step S44, the failure pre-detection process of the procedure illustrated in FIG. 11 is performed for the pre-detected failure.

In step S50 of FIG. 11, the failure pre-detection unit 120 determines whether the pre-detected failure is known. Determining whether a pre-detected failure is known may be performed using a statistical classification method such as the type of physical data or virtual data item whose difference exceeds the threshold value or a feature amount, or a classification method by deep learning.

When it is determined that the pre-detected failure is known, the failure pre-detection unit 120 searches the existing failure determination data for the type and cause of the failure in step S52. Proceeding to step S54, the failure pre-detection unit 120 calculates the number of processes or the period until the manufacturing is affected from the searched failure type and cause and the past failure history. Proceeding to step S56, the failure pre-detection unit 120 causes, for example, the host computer 22 to display the failure pre-detection information and the failure countermeasure method.

Therefore, the operator may deal with the failure at a timing in consideration of the number of processes or the period until the manufacturing is affected by confirming the failure pre-detection information displayed on the host computer 22 and the failure countermeasure method.

Meanwhile, when it is determined that the pre-detected failure is not known, the failure pre-detection unit 120 calculates the transition of the future deviation amount from the data of the deviation amount between the physical data and the virtual data up to the present in step S58. Proceeding to step S60, the failure pre-detection unit 120 executes a simulation using a simulation model based on the calculated transition of the deviation amount in the future, and calculates the number of processes or the period that affects the manufacturing.

Proceeding to step S62, the failure pre-detection unit 120 causes, for example, the host computer 22 to display the failure pre-detection information and the number of processes or the period until the manufacturing is affected calculated in step S60.

Proceeding to step S64, the failure pre-detection unit 120 adds the type and cause of the failure input by the operator as existing failure determination data after the cause of the failure is found. By the process of step S64, the type of failure whose cause of failure is determined is determined to be a known failure in step S50. The process of performing the failure pre-detection in FIGS. 10 and 11 is determines that the difference between the physical data and the virtual data is the state before the failure. In the simulation by the simulation model, the influence of the difference on the process may be determined by calculating the virtual process result data in which there is a difference between the physical sensor data and the virtual sensor data. In addition, by accumulating and checking the amount of deviation for each process, it is possible to determine how many processes have a grace period before lot-out (which affects production).

As described above, the information processing system 1 according to the present embodiment may deal with an unknown failure pattern by determining the difference between the physical data and the virtual data as the pre-failure state. In addition, the information processing system 1 according to the present embodiment may determine the influence on the process of the portion where the condition has deteriorated, and may be operated by delaying the repair time without urgently stopping the semiconductor manufacturing apparatus 10 depending on the degree of influence.

According to the information processing system 1 according to the present embodiment, it is possible to detect failures that is not predictable from past cases and failures that is predictable based on the difference between the virtual sensor data predicted in advance by the simulation model and the physical sensor data of the process being executed. Further, according to the information processing system 1 according to the present embodiment, since it is possible to detect a failure in advance, it is possible to accurately grasp the maintenance time when maintenance is required, suppress unnecessary maintenance, and reduce the running cost.

For example, a simulation using a simulation model of the semiconductor manufacturing apparatus 10 may be executed to calculate the cumulative film thickness attached to the semiconductor manufacturing apparatus 10 during the process. As a result, the optimum cleaning recipe time may be calculated for the cumulative film thickness, the consumption of expensive cleaning gas may be suppressed, and the cutting residue of the film and the excessive cutting of quartz may be prevented.

SUMMARY

According to the information processing system 1 according to the present embodiment, the state of film adhesion on the wafer of the semiconductor manufacturing apparatus 10 during the process, the temperature of the wafer, and the state of the process such as gas and plasma may be calculated by the simulation model of the semiconductor manufacturing apparatus 10 and visualized in real time.

Therefore, according to the information processing system 1 according to the present embodiment, it is possible to obtain the same result as that of the external measuring device 24 in real time without waiting for the measurement by the external measuring device 24 after executing the process. As a result, after executing the process, the operator may determine whether the processed wafer is normal/lot-out, and is a non-defective product without waiting for the measurement by the external measuring device 24. According to the information processing system 1 according to the present embodiment, the number of monitor wafers and the number of various measurements by the external measuring device 24 may be reduced to reduce the operating cost. Further, according to the information processing system 1 according to the present embodiment, since the state of the process of the semiconductor manufacturing apparatus 10 may be visualized while the process is being executed by the semiconductor manufacturing apparatus 10, it is possible to visualize the physical phenomenon occurring on the wafer and objectively grasp the problem, and promote the development.

In addition, according to the process parameter adjusting process by the process parameter adjusting unit 124 of the information processing system 1 according to the present embodiment, the process parameters may be optimized by searching and changing the process parameters for each process based on the simulation model of the semiconductor manufacturing apparatus 10. Further, the simulation by the simulation model of the semiconductor manufacturing apparatus 10 may also simulate the part related to the process performance such as the cumulative film thickness, thereby suppressing the influence of the cumulative film thickness, and always exerting the performance that the semiconductor manufacturing apparatus 10 may have.

Since the information processing system 1 according to the present embodiment may automatically input process parameters, it is not necessary to manually set process parameters, man-hours may be reduced, and input errors and variations due to workers may be eliminated.

Further, the information processing system 1 according to the present embodiment may change the ratio of the factors related to the process according to the customer's demand by searching for and changing the process parameters based on the simulation model of the semiconductor manufacturing apparatus 10. For example, it is possible to implement process parameters that reduce the amount of electricity used and process parameters that reduce the amount of gas used according to the customer's demand.

Further, the information processing system 1 according to the present embodiment searches for and changes process parameters by designating, for example, the thickness and quality of the film to be attached on the wafer, and restrictions (e.g., thermal budget), thereby implementing the best control based on the simulation model.

Further, the information processing system 1 according to the present embodiment may predict the possibility of failure from the difference between the virtual sensor data predicted in advance by the simulation model and the physical sensor data of the process being executed, and may detect a failure in advance and a maintenance time in advance.

First Embodiment

In the following, a temperature simulation model example will be described as an example of the 1DCAE simulation model of the semiconductor manufacturing apparatus 10.

Figure 12:
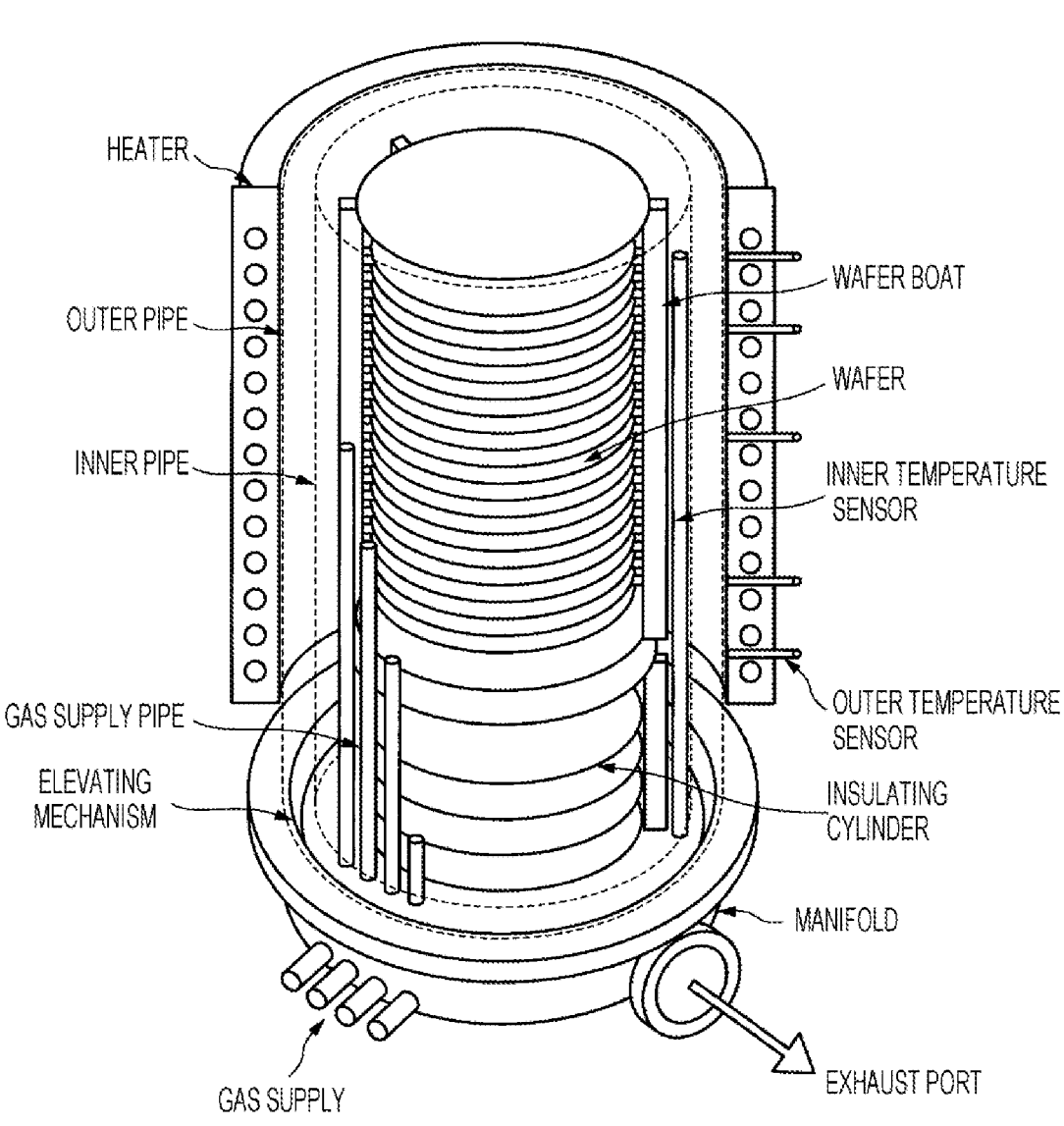
FIG. 12 is a schematic diagram of an example illustrating a temperature-related part of a semiconductor manufacturing apparatus.

FIG. 12 is a schematic diagram of an example illustrating a temperature-related part of a semiconductor manufacturing apparatus. The semiconductor manufacturing apparatus 10 has a heat treatment furnace capable of accommodating a plurality of wafers. The heat treatment furnace is a processing container for accommodating and processing wafers. The heat treatment furnace is formed into a substantially cylindrical shape by quartz having high heat resistance, and has an exhaust port. The heat treatment furnace is configured in a vertical shape extending in the vertical direction. A gas exhaust port is connected to the exhaust port of the heat treatment furnace.

A heater is provided on the side of the heat treatment furnace to surround the heat treatment furnace so that the wafer housed in the heat treatment furnace may be heated. The lower end of the heat treatment furnace is open so that wafers may be loaded and unloaded. The opening at the lower end of the heat treatment furnace is configured to be opened and closed by an elevating mechanism.

A wafer boat is provided above the elevating mechanism. A wafer boat is a substrate holder for holding wafers, and is configured to be able to hold a plurality of wafers in multiple stages in a vertically separated state.

For example, in the schematic view of FIG. 12, the heater configuration, the reactor configuration, and the configuration around the heater are created as a simulation model of 1DCAE, and a virtual temperature sensor may be constructed based on the power value, which is an example of the input data given to the heater. Further, in order to confirm the certainty of the virtual temperature sensor, the physical temperature sensor included in the existing sensor 11 and the additional sensor 12 is used.

For example, examples of the existing sensor 11 include an inner temperature sensor, an outer temperature sensor, a heater ambient temperature heater, a reactor internal temperature sensor, a gas supply pipe heater temperature sensor, a gas exhaust pipe heater temperature sensor, and an elevating mechanism heater temperature sensor. Further, examples of the additional sensor 12 include a temperature sensor installed in the wafer surface, a temperature sensor installed in the heat insulating cylinder and the reactor side elevating mechanism surface, and a gas introduction temperature sensor. The additional sensor 12 is not mounted in the final product shipped to the customer. The existing sensor 11 is mounted on the final product shipped to the customer.

Figure 13:
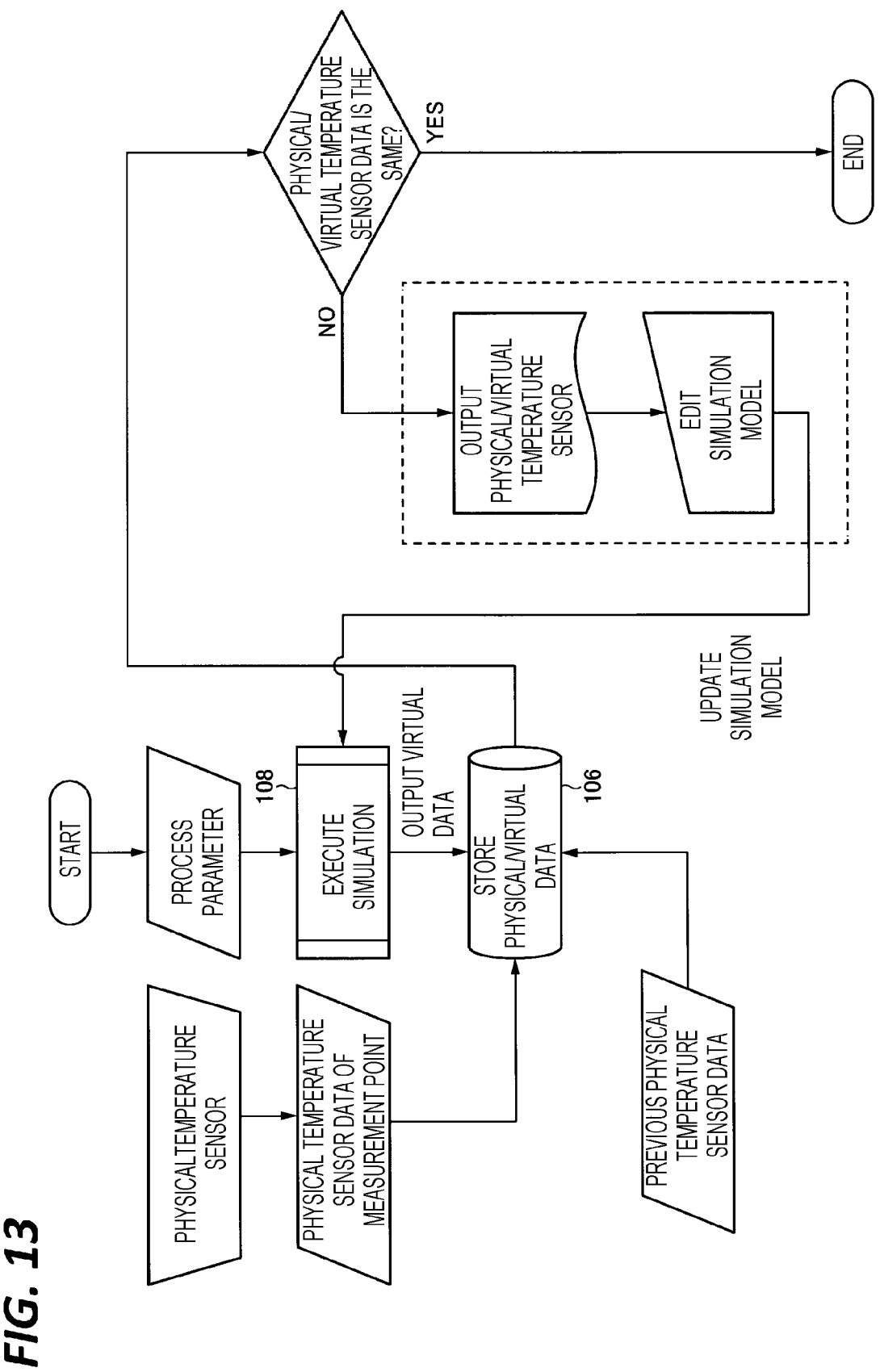
FIG. 13 is an explanatory diagram of an example illustrating a process of creating and updating a temperature-related simulation model.

For example, the process illustrated in FIG. 13 is performed in creating and updating a temperature-related simulation model. FIG. 13 is an explanatory diagram of an example illustrating the process of creating and updating a temperature-related simulation model.

The simulation execution unit 108 of the autonomous controller 13 acquires, for example, the power value of the heater, the set value of a blower, the gas flow rate and temperature, and the wafer boat elevating position as examples of the process parameters of the process being executed by the semiconductor manufacturing apparatus 10. The simulation execution unit 108 outputs the virtual temperature sensor data and the virtual process result data by executing the simulation by the simulation model of the semiconductor manufacturing apparatus 10 according to the process parameters.

Further, the physical temperature sensor, which is the existing sensor 11 and the additional sensor 12, measures the temperature at the measurement point and outputs the temperature as the physical temperature sensor data at the measurement point. The database 106 stores the output virtual temperature sensor data, the virtual process result data, the physical temperature sensor data of the measurement point, and the previous physical temperature sensor data.

The simulation result determination unit 110 compares the virtual temperature sensor data and the physical temperature sensor data stored in the database 106 for each measurement point, and determines whether the virtual temperature sensor data and the physical temperature sensor data of the same measurement point stored in the database 106 are the same.

When it is determined that the virtual temperature sensor data and the physical temperature sensor data are the same, the simulation result determination unit 110 determines that the virtual temperature sensor data is correct. When it is determined that the virtual temperature sensor data and the physical temperature sensor data are not the same, the simulation result determination unit 110 outputs the physical temperature sensor data and the virtual temperature sensor data for recording.

Thereafter, for example, the simulation model is manually edited while performing a data verification offline, and the simulation model of the simulation execution unit 108 is updated.

In this way, in the creation and update of the simulation model, the simulation model of the simulation execution unit 108 may be updated as needed while performing the data verification offline. Further, in the creation and update of the simulation model, unless the physical specification of the target semiconductor manufacturing equipment 10 is changed, the virtual data and the physical data may be compared, and the process parameters may be edited according to the algorithm while the operation to produce the maximum result for the input data of the specification may be performed.

Figure 14:
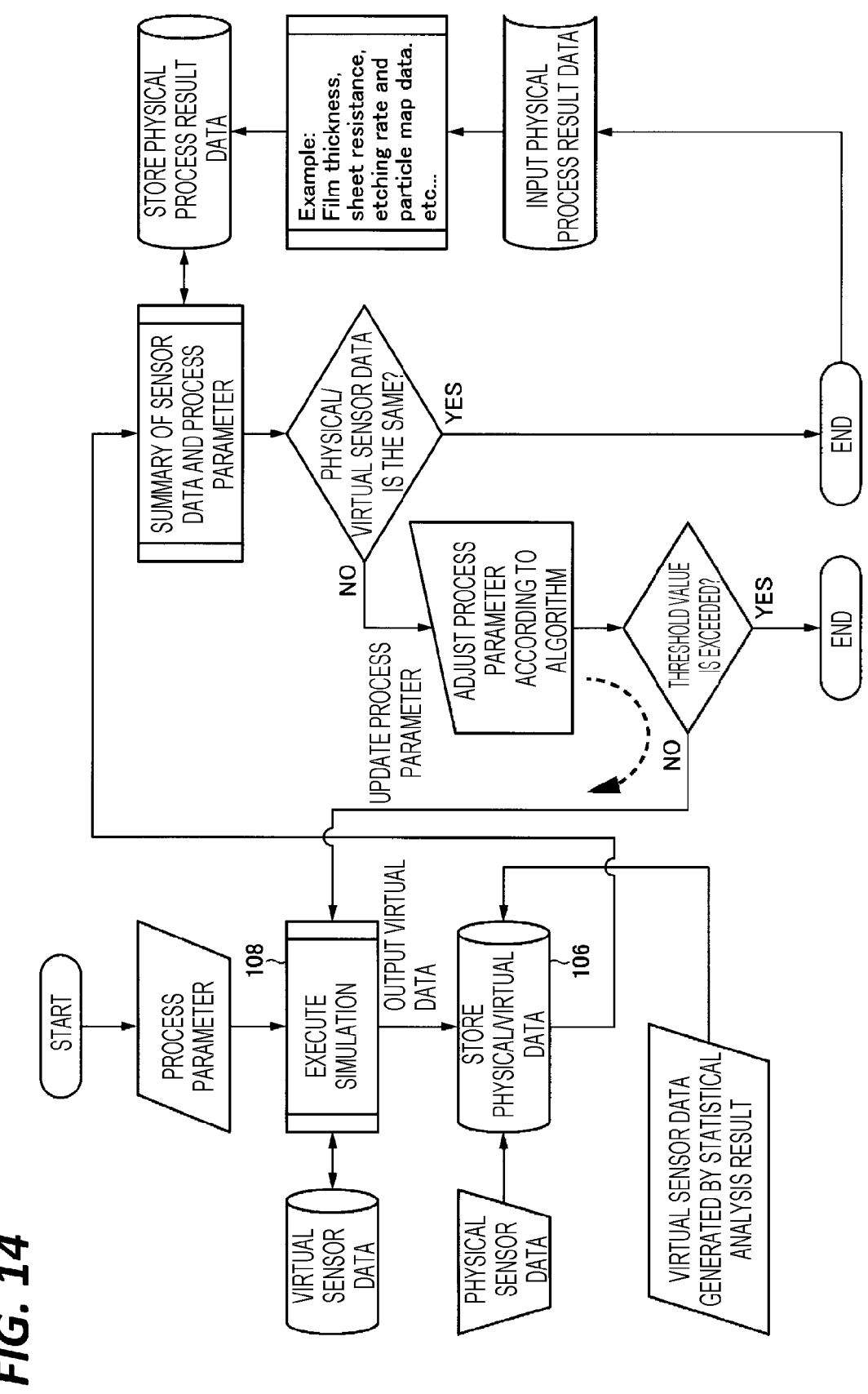
FIG. 14 is an explanatory diagram of an example illustrating a process of creating and updating a temperature-related simulation model.

Further, for example, when creating and updating a temperature-related simulation model, the process illustrated in FIG. 14 may be performed. FIG. 14 is an explanatory diagram of an example illustrating the process of creating and updating a temperature-related simulation model. For example, in the phase of normal operation (during normal operation), by performing the process as illustrated in FIG. 14, an example is illustrated in which the process parameters may be adjusted as a method other than updating the simulation model.

The simulation execution unit 108 of the autonomous controller 13 acquires the process parameters of the process being executed by the semiconductor manufacturing apparatus 10. The simulation execution unit 108 outputs the virtual temperature sensor data and the virtual process result data by executing the simulation by the simulation model of the semiconductor manufacturing apparatus 10 according to the acquired process parameters.

The existing sensor 11 measures the measurement point and outputs the measurement point as physical sensor data of the measurement point. The database 106 stores the output virtual sensor data, virtual process result data, and physical sensor data of the existing sensor 11. In addition, the database 106 stores the virtual sensor data of the additional sensor 12 simulated previously and the virtual sensor data of the additional sensor 12 generated by the statistical analysis result.

The simulation result determination unit 110 compares the virtual sensor data with the physical sensor data of the existing sensor 11 and determines whether the virtual sensor data and the physical sensor data of the same measurement point stored in the database 106 are the same. In addition, the simulation result determination unit 110 may compare the virtual sensor data of the additional sensor 12 simulated previously with the virtual sensor data of the additional sensor 12 generated by the statistical analysis result, and determine whether the virtual sensor data of the same measurement point is the same.

When it is determined that the virtual sensor data is not the same, the simulation result determination unit 110 adjusts the process parameters according to the algorithm. When the adjusted amount of process parameters does not exceed a predetermined threshold value, the simulation execution unit 108 updates to the adjusted process parameters and continues the simulation by the simulation model of the semiconductor manufacturing apparatus 10.

Further, when the adjustment amount of process parameters exceeds the threshold value, the simulation execution unit 108 stops the optimization by adjusting the process parameters. When it is determined that the virtual sensor data and the physical sensor data of the same measurement point stored in the database 106 are the same, the simulation result determination unit 110 determines that the adjustment of the process parameters is unnecessary, and ends the process without adjusting the process parameters.

After the process is ended, when the customer inputs physical process result data such as a film thickness, a sheet resistance, an etching rate, and particle map data, the data is saved in the database 106 as virtual process result data.

In the normal operation phase in which the process illustrated in FIG. 14 is performed, the virtual data and the physical data are compared with each other, the process parameters are edited according to the algorithm, and the operation to produce the maximum result is performed with respect to the input data of the specifications. Further, in the normal operation phase in which the process illustrated in FIG. 14 is performed, a delay of one run occurs. However, as the amount of data stored in the database 106 increases, the accuracy of machine learning of the loop indicated by the broken line arrow improves, and the accuracy of predictive control such as adjustment of the optimum process parameters improves with each RUN.

Figure 15:
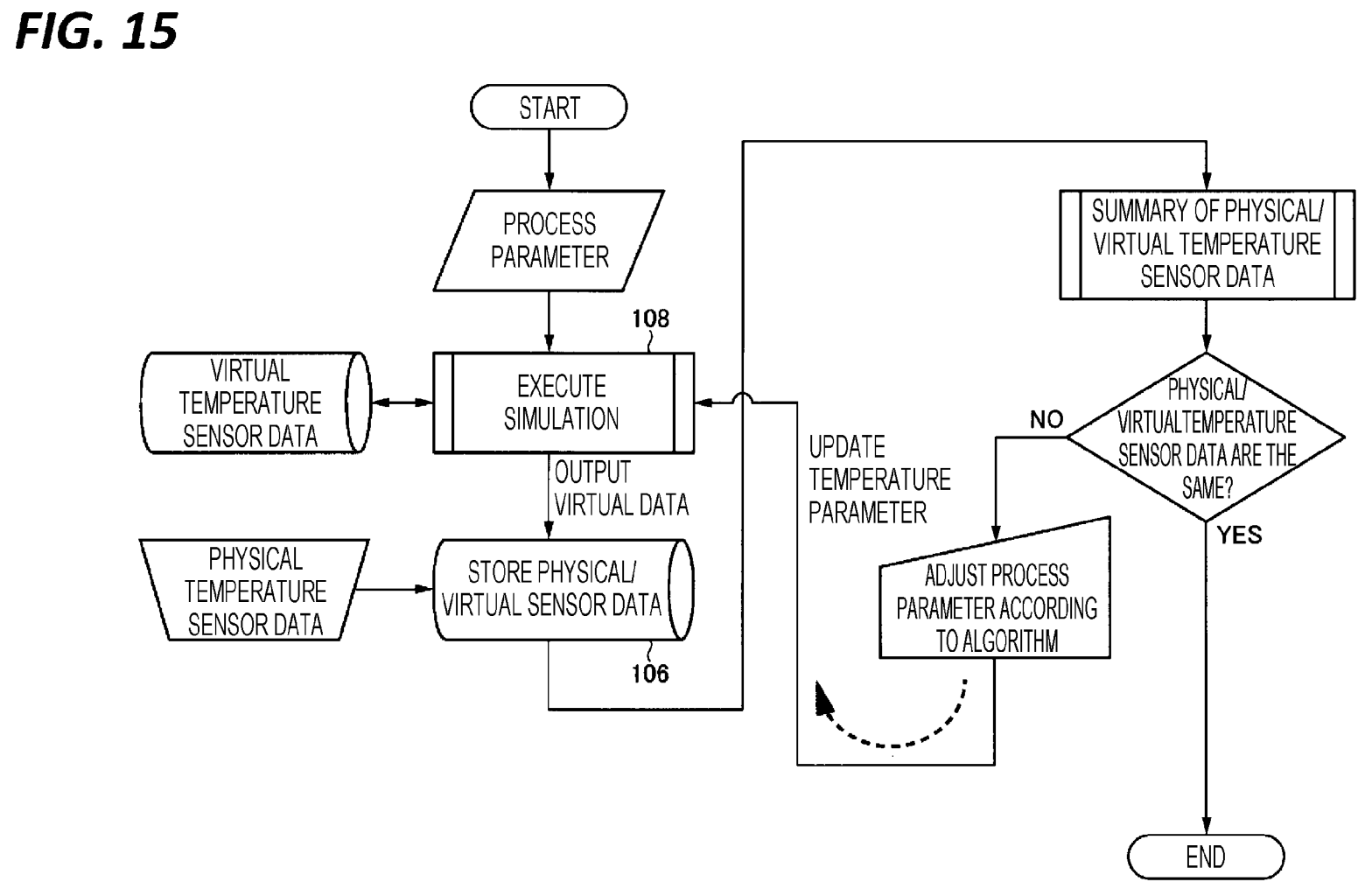

FIG. 15 illustrates an excerpt of the temperature category from the process of creating and updating the temperature-related simulation model illustrated in FIG. 14. The simulation execution unit 108 of the autonomous controller 13 acquires the process parameters of the process being executed by the semiconductor manufacturing apparatus 10. The simulation execution unit 108 outputs the virtual temperature sensor data and the virtual process result data by executing the simulation by the simulation model of the semiconductor manufacturing apparatus 10 according to the acquired process parameters.

Further, the existing sensor 11 measures the temperature at the measurement point and outputs the temperature as physical temperature sensor data at the measurement point.

The database 106 stores the output virtual sensor data, virtual process result data, and physical sensor data of the existing sensor 11.

The database 106 also stores previously simulated virtual temperature sensor data. The simulation result determination unit 110 compares the virtual temperature sensor data stored in the database 106 with the physical temperature sensor data of the existing sensor 11, and determines whether the virtual temperature sensor data and the physical temperature sensor data of the same measurement point stored in the database 106 are the same.

In addition, the simulation result determination unit 110 may compare the virtual sensor data of the additional sensor 12 simulated previously with the virtual sensor data of the additional sensor 12 generated by the statistical analysis result, and determine whether the virtual sensor data of the same measurement point is the same.

When it is determined that the virtual sensor data is not the same, the simulation result determination unit 110 adjusts the process parameters according to the algorithm. The simulation execution unit 108 executes the simulation by the simulation model of the semiconductor manufacturing apparatus 10 according to the adjusted process parameters (temperature parameters). Further, when it is determined that the virtual sensor data is the same, the simulation result determination unit 110 determines that the adjustment of the process parameters is unnecessary and does not adjust the process parameters.

In the process illustrated in FIG. 15, the optimum process parameters are edited according to the algorithm based on the result of comparing the virtual temperature sensor data and the physical temperature sensor data. Further, the virtual temperature sensor does not necessarily have a one-to-one correspondence with the existing sensor 11 and the additional sensor 12. For example, the virtual temperature sensor may be a virtual sensor that outputs virtual temperature sensor data of data that is calculable from the physical sensor data of the plurality of existing sensors 11 and the additional sensor 12. The virtual temperature sensor is an in-reactor temperature distribution sensor, a wafer in-plane surface temperature distribution sensor, a wafer inter-plane temperature distribution sensor, or a supply gas temperature sensor.

Other examples of the virtual sensor include a wafer in-plane/inter-plane temperature sensor, a gas pressure distribution sensors in the reactor, a gas concentration distribution sensor in the reactor, a plasma distribution sensor, a gas flow rate and flow direction sensor in the reactor, a supply gas temperature sensor, a dew point meter sensor that performs a calculation from a thermometer and a hygrometer, a sensor that predicts the overall airflow in the reactor from a very small number of measuring devices, an abnormal point rangefinder sensor due to vibration, and a material deterioration sensor due to vibration.

Figure 16:
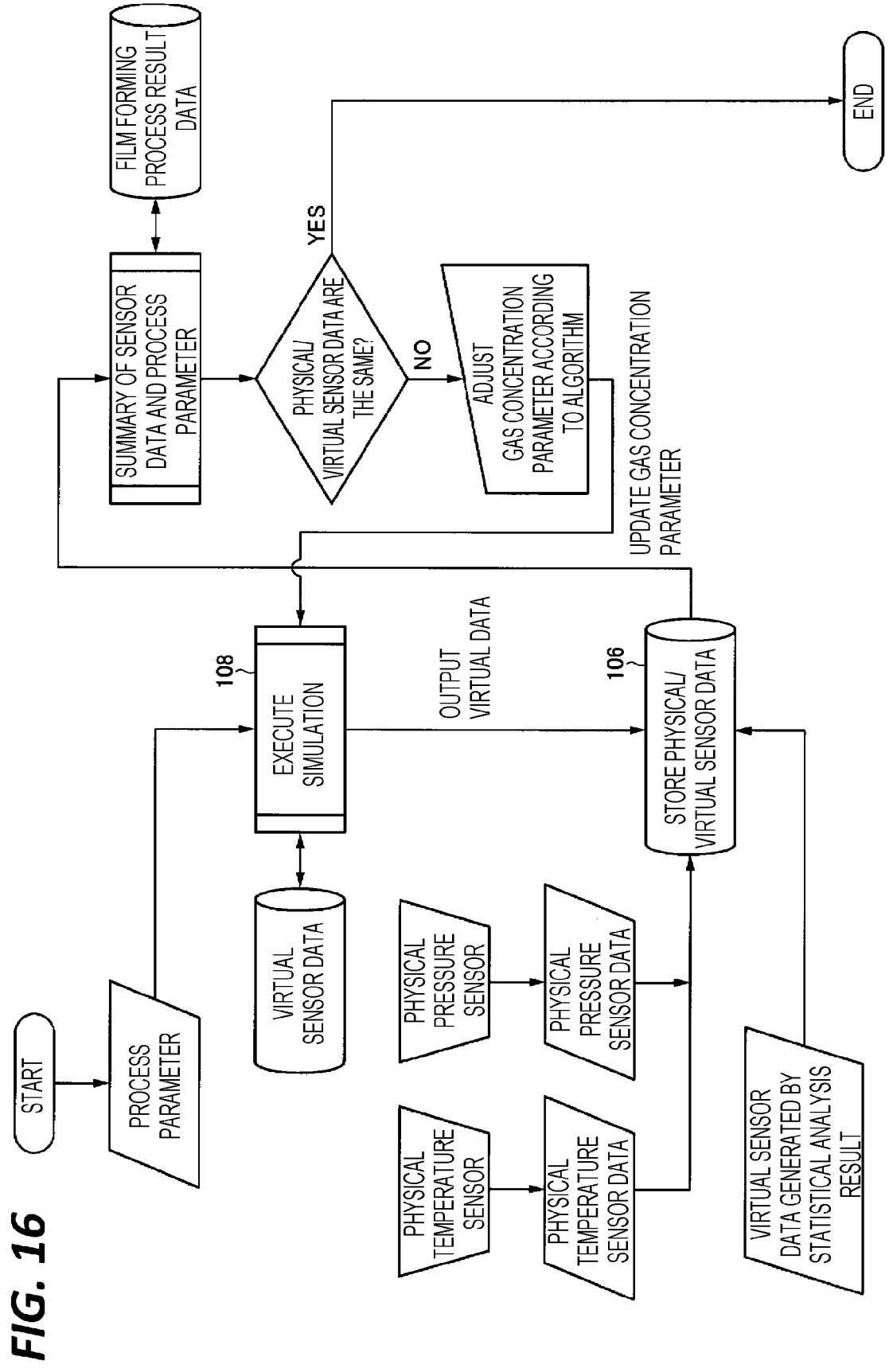
FIG. 16 is an explanatory diagram of an example illustrating a process of updating a virtual sensor.

The optimization of the virtual sensor is performed as illustrated in, for example, FIG. 16. FIG. 16 is an explanatory diagram of an example illustrating the process of updating the virtual sensor. FIG. 16 illustrates an example of a virtual gas concentration sensor which is an example of the virtual sensor.

The simulation execution unit 108 of the autonomous controller 13 acquires the process parameters of the process being executed by the semiconductor manufacturing apparatus 10. The simulation execution unit 108 outputs the virtual temperature sensor data and the virtual process result data by executing the simulation by the simulation model of the semiconductor manufacturing apparatus 10 according to the acquired process parameters.

Further, the physical temperature sensor and the physical pressure sensor, which are examples of the existing sensor 11, measure the measurement point and output the measurement point as the physical temperature sensor data and the physical pressure sensor data of the measurement point. The database 106 stores the output virtual sensor data, virtual process result data, and physical sensor data of the existing sensor 11. In addition, the database 106 stores the virtual sensor data simulated previously and the virtual sensor data generated by the statistical analysis result.

The simulation result determination unit 110 compares the virtual sensor data with the physical sensor data of the existing sensor 11 and determines whether the virtual sensor data and the physical sensor data of the same measurement point stored in the database 106 are the same. In addition, the simulation result determination unit 110 may compare the virtual sensor data of the additional sensor 12 simulated previously with the virtual sensor data of the additional sensor 12 generated by the statistical analysis result, and determine whether the virtual sensor data of the same measurement point is the same.

When it is determined that the virtual sensor data is not the same, the simulation result determination unit 110 adjusts the process parameters (gas concentration parameters) according to the algorithm. The simulation execution unit 108 updates to the adjusted gas concentration parameter, and continues the simulation by the simulation model of the semiconductor manufacturing apparatus 10.

When it is determined that the virtual sensor data and the physical sensor data of the same measurement point stored in the database 106 are the same, the simulation result determination unit 110 determines that the adjustment of the gas concentration parameter is unnecessary, and ends optimizing the virtual sensor.

Further, physical phenomena including the virtual sensor operation in virtual space are determined by a simulation model. When the specifications of the target semiconductor manufacturing apparatus 10 are changed, the simulation model is also basically updated. Therefore, when the specifications of the target semiconductor manufacturing apparatus 10 are changed, the process parameters related to the virtual sensor are optimized as illustrated in FIG. 16. In FIG. 16, the virtual sensor data obtained from the statistical analysis results is also utilized.

In FIG. 16, based on the process result and the sensor data related to temperature and pressure, the update of the gas concentration parameter is automatically executed according to the machine learning algorithm from the comparison result between the physical data and the virtual data. When the physical data and the virtual data match, the construction of the virtual sensor related to the gas concentration of the target semiconductor manufacturing apparatus 10 is completed.

Figure 17:
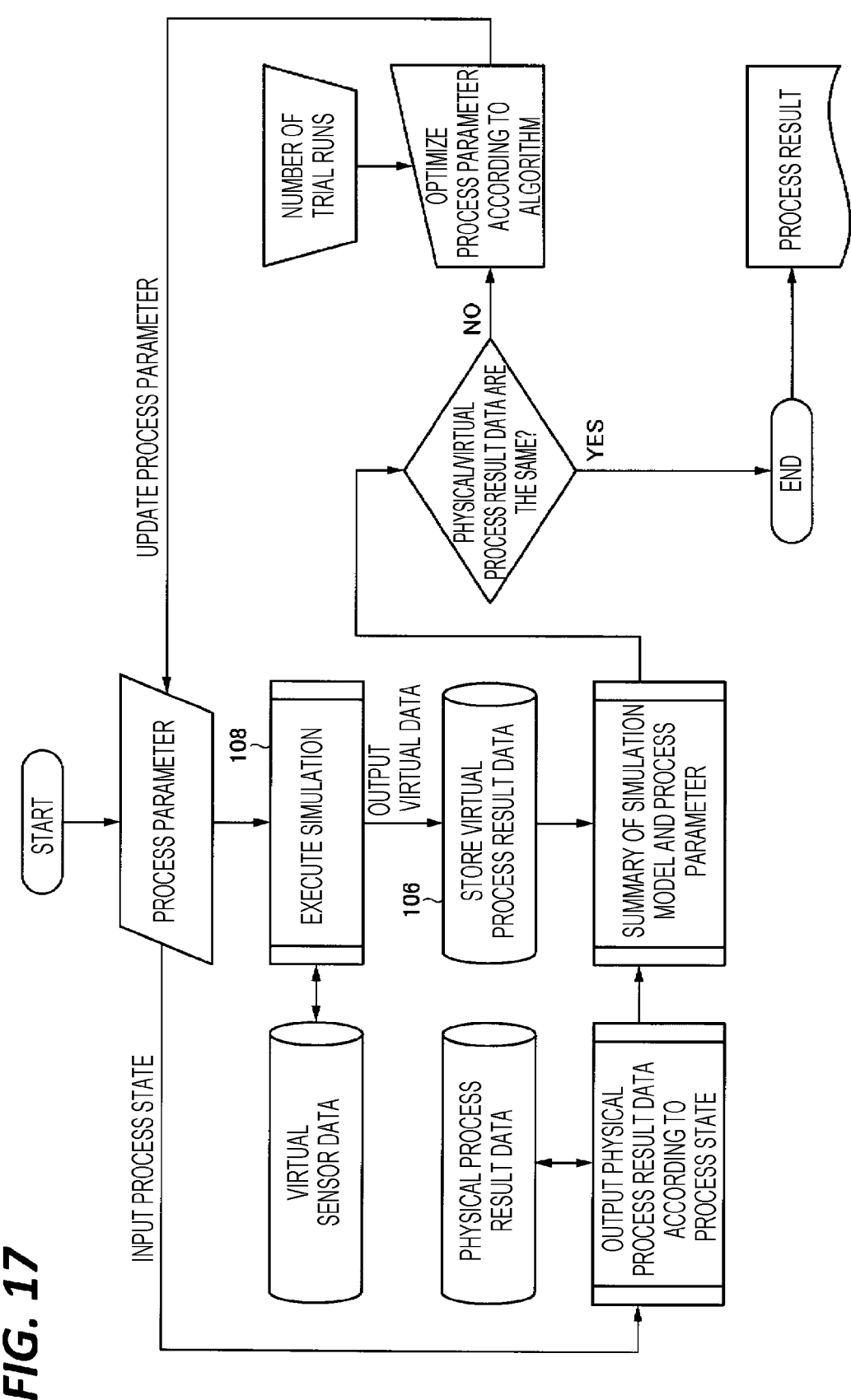
FIG. 17 is an explanatory diagram of an example illustrating a process of updating a simulation model.

The simulation model may be optimized by a trial run in a virtual space, for example, as illustrated in FIG. 17. FIG. 17 is an explanatory diagram of an example illustrating the process of updating the simulation model.

In the process of FIG. 17, the simulation model is optimized using the simulation model and the virtual sensor, and the process parameters are optimized in the virtual space based on the already acquired physical process result data. In FIG. 17, the simulation model and the process parameters are optimized according to the machine learning algorithm with the teacher data. Further, the number of trial runs in the virtual space may be specified by setting.

Figure 18:
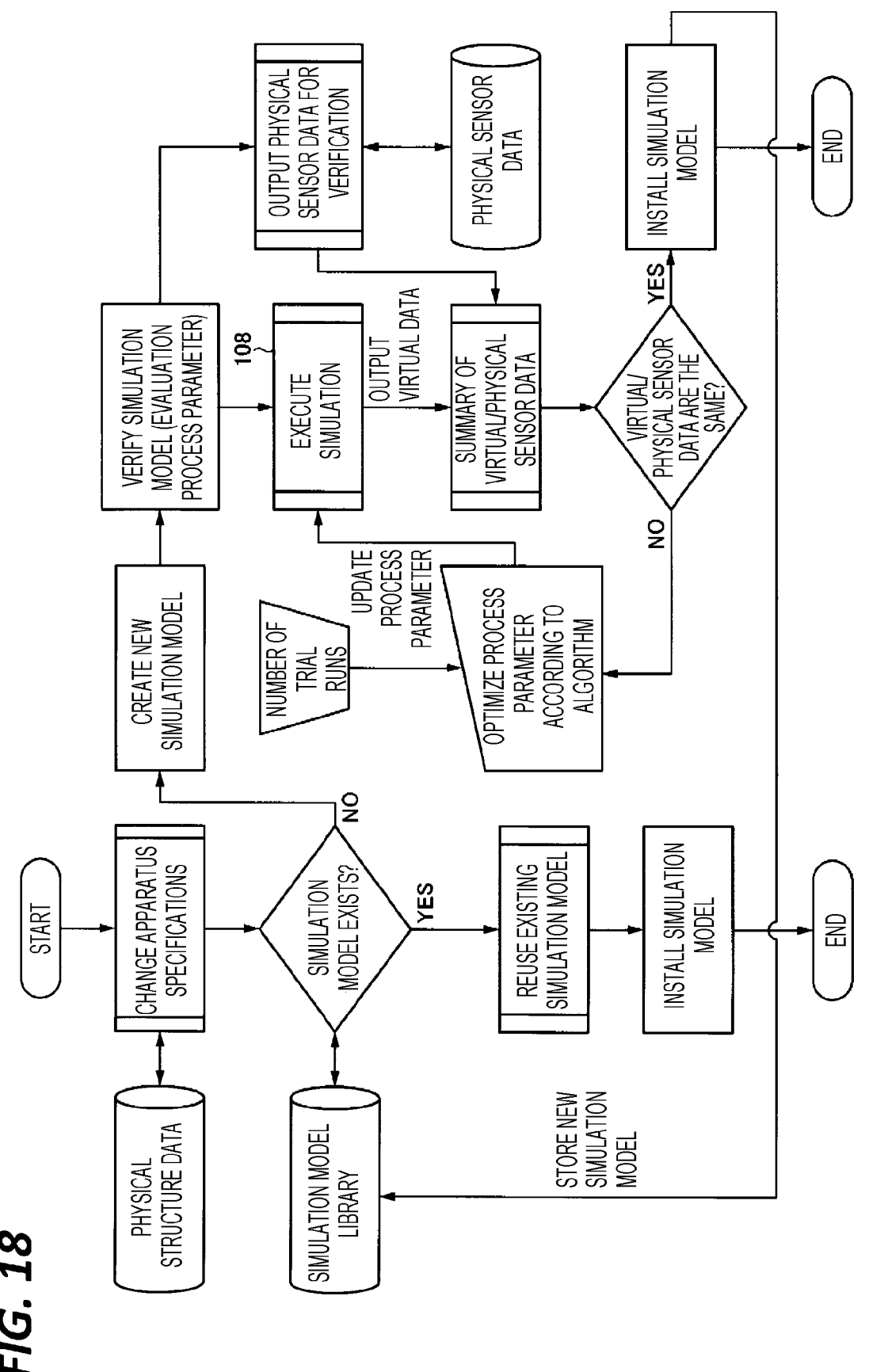
FIG. 18 is an explanatory diagram of an example illustrating a process of updating a simulation model when a specification of a target semiconductor manufacturing apparatus is changed.

Further, updating the simulation model is indispensable when the specifications of the target semiconductor manufacturing apparatus 10 are changed. FIG. 18 is an explanatory diagram of an example illustrating a process of updating a simulation model when the specifications of the target semiconductor manufacturing apparatus are changed.

In the process of FIG. 18, when the specifications of the target semiconductor manufacturing apparatus 10 are changed, and when the simulation model of the target semiconductor manufacturing apparatus 10 is already stored in a simulation model library, the existing simulation model is reused.

Further, when the simulation model of the target semiconductor manufacturing apparatus 10 is not already stored in the simulation model library, a new simulation model is created. Verification of the created simulation model is performed based on the evaluation process parameters, the virtual data that is a result of executing the simulation according to the evaluation process parameters, and the physical data that has already been saved. Further, the newly created simulation model may be installed and registered in the library after confirming the certainty by executing the process using the target semiconductor manufacturing apparatus 10.

Further, updating the simulation model is indispensable when the specifications of the process are changed. The process of updating the simulation model when the specifications of the process are changed is the same as that of FIG. 18 except for a part thereof.

For example, in the process of updating the simulation model when the specifications of the process are changed, the created simulation model is verified based on the already saved physical data. Further, the newly created simulation model may be installed and registered in the library after confirming the certainty by executing the process using the target semiconductor manufacturing apparatus 10.

Figure 19:
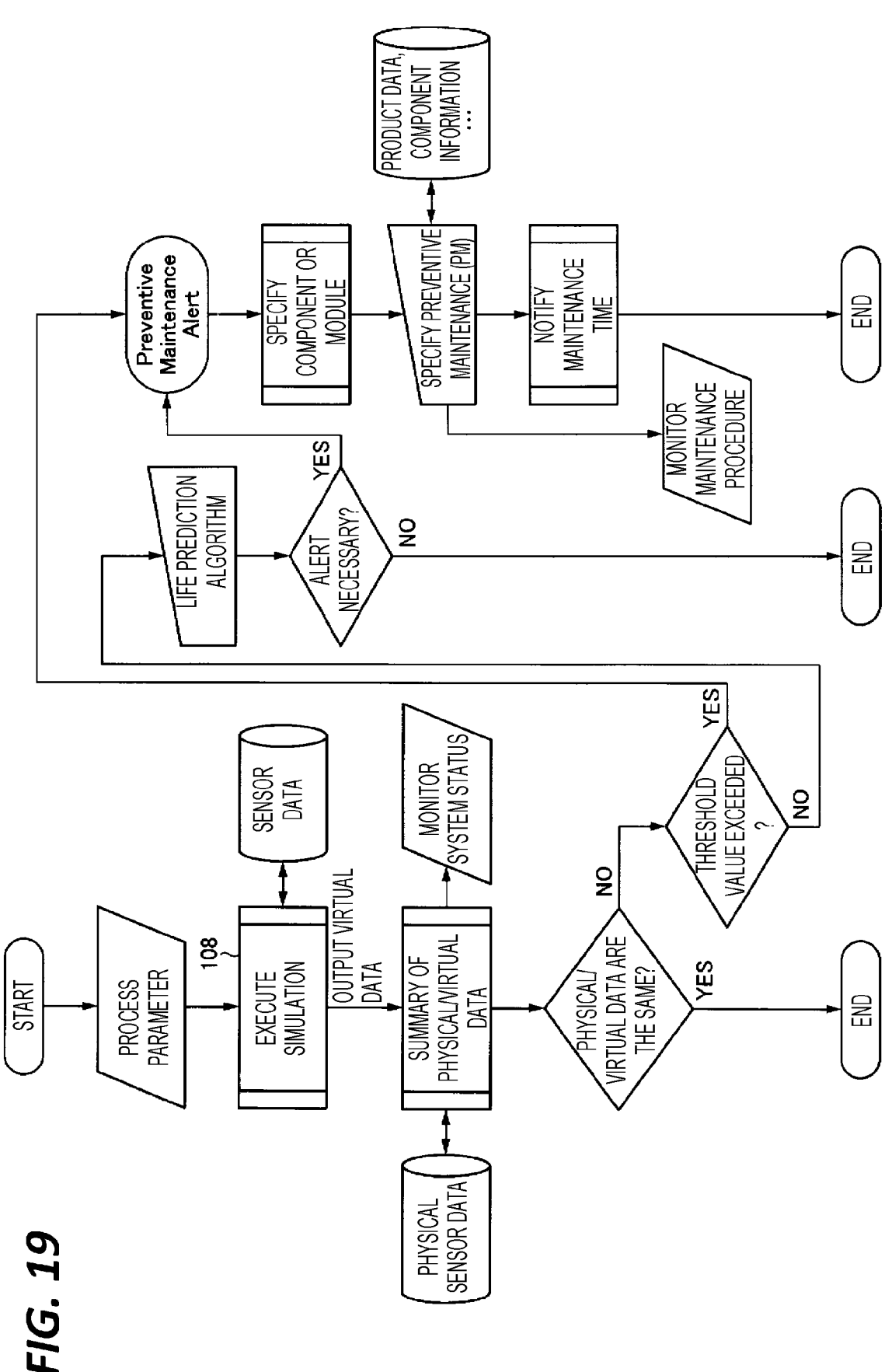
FIG. 19 is an explanatory diagram of an example illustrating a process of pre-detecting a maintenance time.

The maintenance time pre-detection is performed, for example, as illustrated in FIG. 19. FIG. 19 is an explanatory diagram of an example illustrating a process of pre-detecting a maintenance time. The simulation execution unit 108 of the autonomous controller 13 acquires the process parameters of the process being executed by the semiconductor manufacturing apparatus 10.

The simulation execution unit 108 outputs the virtual sensor data and the virtual process result data by executing the simulation by the simulation model of the semiconductor manufacturing apparatus 10 according to the acquired process parameters.

The simulation result determination unit 110 compares the virtual sensor data with the physical sensor data of the existing sensor 11 and determines whether the virtual sensor data and the physical sensor data of the same measurement point stored in the database 106 are the same. In addition, the simulation result determination unit 110 may compare the virtual sensor data of the additional sensor 12 simulated previously with the virtual sensor data of the additional sensor 12 generated by the statistical analysis result, and determine whether the virtual sensor data of the same measurement point is the same.

When it is determined that the virtual temperature sensor data and the physical temperature sensor data are the same, the simulation result determination unit 110 determines that there is no abnormality and ends the process. When it is determined that the virtual temperature sensor data and the physical temperature sensor data are not the same, the simulation result determination unit 110 determines whether the difference between the compared virtual sensor data and physical sensor data exceeds the threshold value.

When the threshold value is not exceeded, the simulation result determination unit 110 predicts the life according to the life prediction algorithm and determines whether an alert is necessary. Further, the life prediction algorithm is generated by machine learning or statistical analysis software. When it is determined that the alert is not necessary, the simulation result determination unit 110 ends the process.

When it is determined that the alert is necessary, the simulation result determination unit 110 starts processing the maintenance time advance alert. Even when the difference between the compared virtual sensor data and physical sensor data exceeds the threshold value, the simulation result determination unit 110 starts processing the maintenance time advance alert.

In the maintenance time advance alert process, the simulation result determination unit 110 specifies a component or module that requires an alert. The simulation result determination unit 110 specifies the preventive maintenance (PM) information of the component or module as requiring the alert from the product data or the component information. Based on the specified preventive maintenance information, the simulation result determination unit 110 notifies the maintenance time of the specified component or module as the alert is required.

Second Embodiment

In the second embodiment, the mechanism of the first embodiment is used to improve the productivity and energy saving of the target semiconductor manufacturing apparatus 10, and to balance the productivity improvement with the preventive maintenance detection.

Figure 20:
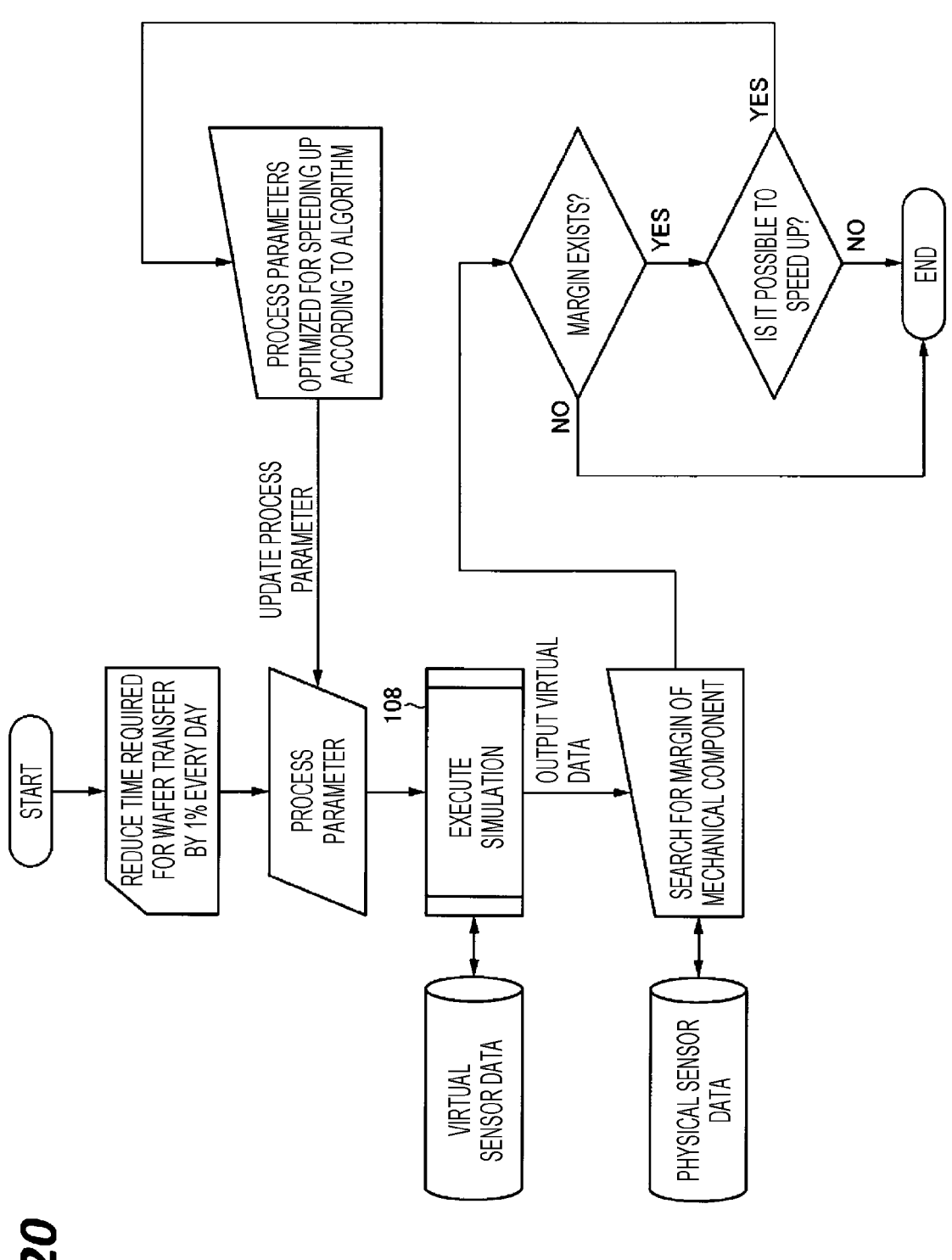
FIG. 20 is an explanatory diagram of an example illustrating a process of improving the productivity of the target semiconductor manufacturing apparatus.

FIG. 20 is an explanatory diagram of an example illustrating a process of improving the productivity of the target semiconductor manufacturing apparatus. FIG. 20 illustrates an example of shortening the wafer transfer time as an example of the productivity improvement process of the target semiconductor manufacturing apparatus 10.

In the target semiconductor manufacturing apparatus 10, for example, in order to reduce the time required for wafer transfer by 1% every day, when there is a mechanical component capable of speeding up, the process parameters are optimized to the extent possible to improve the productivity. Further, the limit of productivity improvement may be determined, for example, by determining the limit using a simulation model or by alerting based on preventive maintenance information.

For example, in FIG. 20, a mechanical component having a margin for speed-up is searched from the mechanical component of the target semiconductor manufacturing apparatus 10, and the speed is increased to the limit of productivity improvement. In the present embodiment, for example, it is possible to speed up to the limit of productivity improvement by determining the limit by a simulation model or alerting based on preventive maintenance information, so that the productivity may be greatly improved. Further, it is desirable that the degree of improvement in productivity improvement (maximization) be selectable.

Further, in the present embodiment, productivity may be improved while maximizing the operating rate of the target semiconductor manufacturing apparatus 10 by, for example, determining the limit by a simulation model or alerting based on preventive maintenance information.

Figure 21:
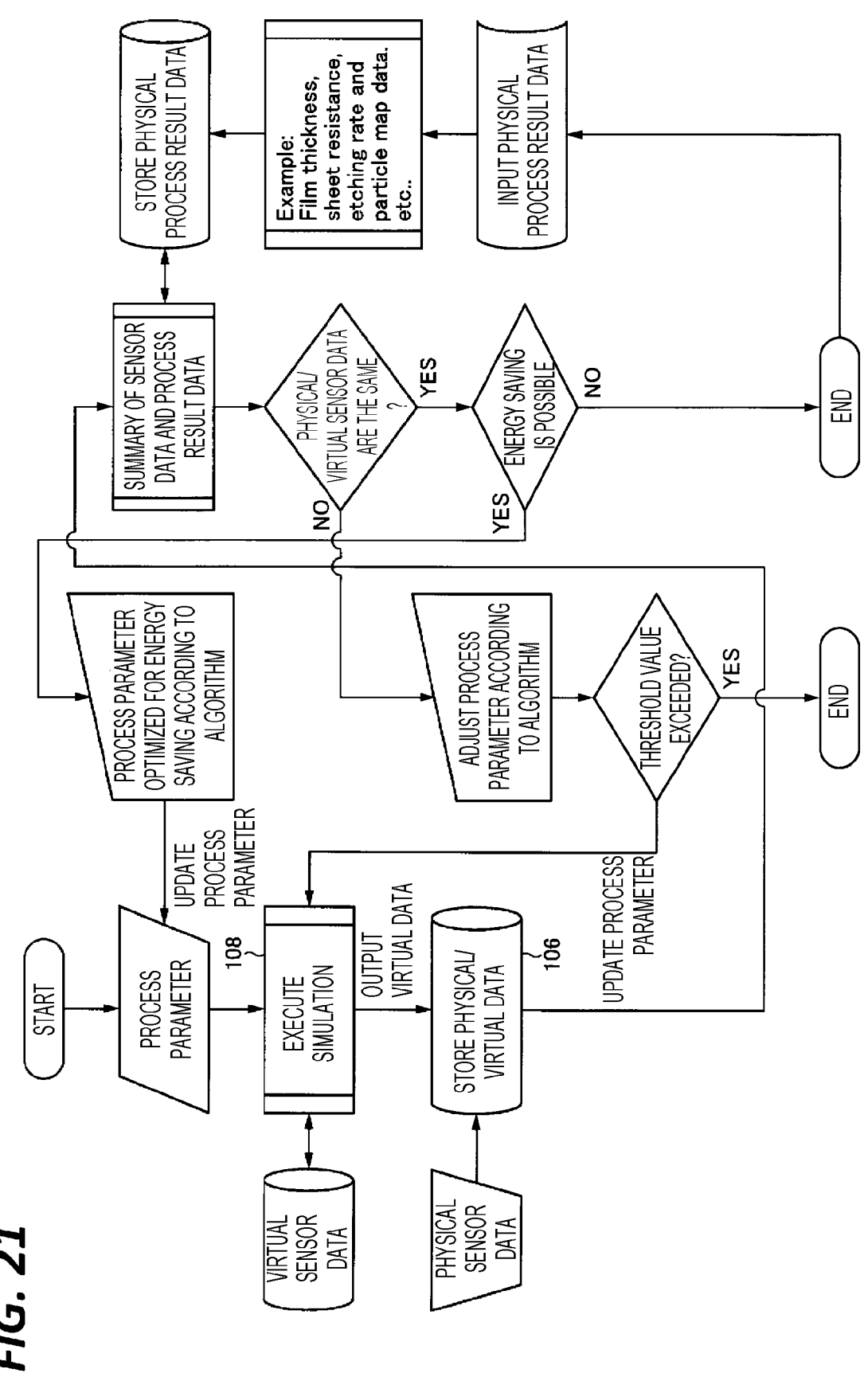
FIG. 21 is an explanatory diagram of an example illustrating an energy-saving process of the target semiconductor manufacturing apparatus.

FIG. 21 is an explanatory diagram of an example illustrating the energy saving process of the target semiconductor manufacturing apparatus. In the target semiconductor manufacturing apparatus 10, process parameters are optimized to the extent possible in order to reduce gas and electric power consumption and implement energy saving.

For example, in FIG. 21, the process parameters are adjusted within a range in which the process parameters of the target semiconductor manufacturing apparatus 10 do not exceed a predetermined threshold value, and the consumption of gas and electric power is reduced to implement energy saving. As described above, in the present embodiment, energy saving may be implemented while maximizing the operating rate of the target semiconductor manufacturing apparatus 10.

Further, by combining the process of pre-detecting the maintenance time in FIG. 19 and the process of improving the productivity of the semiconductor manufacturing apparatus in FIG. 20, it is possible to balance the productivity improvement and the preventive maintenance detection in the present embodiment. When FIGS. 19 and 20 are combined with each other, the process parameters optimized for speeding up in FIG. 20 are used as the process parameters of the simulation execution unit 108 of FIG. 19.

According to the present embodiment, it is possible to automate the optimization of process parameters that has been performed based on the experience and intuition of the operator, and to visualize the process state of the process being executed by the semiconductor manufacturing apparatus 10.

According to the present disclosure, the process state of the semiconductor manufacturing apparatus may be visualized while the process is being executed by the semiconductor manufacturing apparatus.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An information processing system comprising:
physical sensor data acquisition circuitry configured to acquire physical sensor data measured in a semiconductor manufacturing apparatus that executes a process according to a process parameter to control components of the semiconductor manufacturing apparatus;
simulation execution circuitry configured to execute a simulation by a simulation model of the semiconductor manufacturing apparatus with the process parameter as an input to output virtual sensor data and virtual process result data, wherein the simulation is executed by the simulation model in real time while the process is executed by the semiconductor manufacturing apparatus;
simulation result determination circuitry configured to compare the physical sensor data and the virtual sensor data at the same position and time, and determine whether the physical sensor data and the virtual sensor data at the same position and time are the same;
a database configured to store the virtual sensor data simulated in real time as well as virtual sensor data simulated previously; and
a display controller configured to visualize a process state of the semiconductor manufacturing apparatus indicating a state of the process executed by the semiconductor manufacturing apparatus and display the process state on a display during an execution of the process using the physical sensor data, the virtual sensor data, and the virtual process result data, wherein the display controller visualizes on the display: 1) a predicted process state of the semiconductor manufacturing apparatus based on the virtual sensor data and the virtual process result data output from the simulation execution circuitry, and 2) an actual process state of the semiconductor manufacturing apparatus based on the physical sensor data and physical process result data, as substantially similar views of a portion of the semiconductor manufacturing apparatus, at the same time during the execution of the process, each of the substantially similar views including matching measurement points for the virtual process result data and the physical process result data, after executing the process according to the process parameter, the matching measurement points in a form capable of comparing with each other.

2. The information processing system according to claim 1, wherein the simulation result determination circuitry further comprise:

process parameter adjusting circuitry configured to adjust the process parameter so that the physical sensor data and the virtual sensor data approximate each other.

3. The information processing system according to claim 2, further comprising:

simulation model editing circuitry configured to create or update the simulation model so that the physical process result data after the process is executed according to the process parameter and the virtual process result data output from the simulation execution circuitry approximate with each other, and the physical sensor data and the virtual sensor data approximate with each other.

4. The information processing system according to claim 3, wherein the simulation model editing circuitry create or update the simulation model using the physical process result data, the virtual process result data, the physical sensor data, and the virtual sensor data, of a plurality of semiconductor manufacturing apparatuses.

5. The information processing system according to claim 4, wherein the simulation result determination circuitry further comprise:

failure pre-detection circuitry configured to perform a failure pre-detection of the semiconductor manufacturing apparatus based on at least one of a difference between the physical process result data after the process is executed according to the process parameter and the virtual process result data output from the simulation execution circuitry, and a difference between the physical sensor data and the virtual sensor data.

6. The information processing system according to claim 5, wherein the failure pre-detection circuitry monitor the difference between the physical process result data and the virtual process result data or the difference between the physical sensor data and the virtual sensor data, and perform a failure pre-detection of the semiconductor manufacturing apparatus using a failure pattern learned from a difference between the physical process result data and the virtual process result data at a time of a known failure, or the difference between the physical sensor data and the virtual sensor data.

7. The information processing system according to claim 2, wherein the process parameter adjusting circuitry determine the process parameter such that the virtual process result data approximates the physical process result data, to obtain the physical process result data specified by a user.

8. The information processing system according to claim 1, further comprising:

simulation model editing circuitry configured to create or update the simulation model so that the physical process result data after the process is executed according to the process parameter and the virtual process result data output from the simulation execution circuitry approximate each other, and the physical sensor data and the virtual sensor data approximate each other.

9. The information processing system according to claim 8, wherein the simulation model editing circuitry create or update the simulation model using the physical process result data, the virtual process result data, the physical sensor data, and the virtual sensor data of a plurality of semiconductor manufacturing apparatuses.

10. The information processing system according to claim 1, wherein the simulation result determination circuitry further comprise:

failure pre-detection circuitry configured to perform a failure pre-detection of the semiconductor manufacturing apparatus based on at least one of a difference between the physical process result data after the process is executed according to the process parameter and the virtual process result data output from the simulation execution circuitry, and a difference between the physical sensor data and the virtual sensor data.

11. The information processing system according to claim 10, wherein the failure pre-detection circuitry monitor the difference between the physical process result data and the virtual process result data or the difference between the physical sensor data and the virtual sensor data, and perform a failure pre-detection of the semiconductor manufacturing apparatus using a failure pattern learned from a difference between the physical process result data and the virtual process result data at a time of a known failure, or the difference between the physical sensor data and the virtual sensor data.

12. A simulation method comprising:

acquiring physical sensor data measured in a semiconductor manufacturing apparatus that executes a process according to a process parameter to control components of the semiconductor manufacturing apparatus;

executing a simulation by a simulation model of the semiconductor manufacturing apparatus with the process parameter as an input to output virtual sensor data and virtual process result data, wherein the simulation is executed by the simulation model in real time while the process is executed by the semiconductor manufacturing apparatus;

comparing the physical sensor data and the virtual sensor data at the same position and time, and determining whether the physical sensor data and the virtual sensor data at the same position and time are the same;

storing the virtual sensor data simulated in real time as well as virtual sensor data simulated previously; and visualizing a process state of the semiconductor manufacturing apparatus indicating a state of the process executed by the semiconductor manufacturing apparatus and displaying the process state on a display during an execution of the process using the physical sensor data, the virtual sensor data, and the virtual process result data, wherein the visualizing includes displaying: 1) a predicted process state of the semiconductor manufacturing apparatus based on the virtual sensor data and the virtual process result data, and 2) an actual process state of the semiconductor manufacturing apparatus based on the physical sensor data and physical process result data, as substantially similar views of a portion of the semiconductor manufacturing apparatus, at the same time during the execution of the process, each of the substantially similar views including matching measurement points for the virtual process result data and the physical process result data, after executing the actual process according to the process parameter, the matching measurement points in a form capable of comparing with each other.

13. The information processing system according to claim 3, wherein the simulation model editing circuitry update the simulation model by deep learning to be appropriate for the semiconductor manufacturing apparatus.

14. The information processing system according to claim 4, wherein the simulation result determination circuitry further comprise:

failure pre-detection circuitry configured to notify a maintenance time of a specified component of the semiconductor manufacturing apparatus based on at least one of a difference between the physical process result data after the process is executed according to the process parameter and the virtual process result data output from the simulation execution circuitry, and a difference between the physical sensor data and the virtual sensor data.

15. The information processing system according to claim 6, wherein, when determined that a pre-detected failure is unknown, the failure pre-detection circuitry calculate a transition of a future deviation amount based on a deviation amount between the physical process result data and the virtual process result data from a past to a present or between the physical sensor data and the virtual sensor data from a past to a present and execute the simulation by the simulation model with calculated transition of the future deviation amount as an input to output a number of processes or a period of the process.

16. An information processing system comprising:

a plurality of semiconductor manufacturing apparatuses;

a management server configured to manage information about the plurality of semiconductor manufacturing apparatuses, wherein each of the plurality of semiconductor manufacturing apparatuses includes:

physical sensor data acquisition circuitry configured to acquire physical sensor data measured in the semiconductor manufacturing apparatus that executes a process according to a process parameter to control components of the semiconductor manufacturing apparatus;

simulation execution circuitry configured to execute a simulation by a simulation model of the semiconductor manufacturing apparatus with the process parameter as an input to output virtual sensor data and virtual process result data, wherein the simulation is executed by the simulation model in real time while the process is executed by the semiconductor manufacturing apparatus;

simulation result determination circuitry configured to compare the physical sensor data and the virtual sensor data at the same position and time, and determine whether the physical sensor data and the virtual sensor data at the same position and time are the same;

a database configured to store the virtual sensor data simulated in real time as well as virtual sensor data simulated previously; and a display controller configured to visualize a process state of the semiconductor manufacturing apparatus indicating a state of the process executed by the semiconductor manufacturing apparatus and display the process state on a display during an execution of the process using the physical sensor data, the virtual sensor data, and the virtual process result data, wherein the display controller visualizes on the display: 1) a predicted process state of the semiconductor manufacturing apparatus based on the virtual sensor data and the virtual process result data output from the simulation execution circuitry, and 2) an actual process state of the semiconductor manufacturing apparatus based on the physical sensor data and physical process result data, as substantially similar views of a portion of the semiconductor manufacturing apparatus, at the same time during the execution of the process, each of the substantially similar views including matching measurement points for the virtual process result data and the physical process result data, after executing the process according to the process parameter, the matching measurement points in a form capable of comparing with each other.

17. The information processing system according to claim 16, further comprising:

simulation model editing circuitry configured to create or update the simulation model so that the physical process result data after the process is executed according to the process parameter and the virtual process result data output from the simulation execution circuitry approximate with each other, and the physical sensor data and the virtual sensor data approximate with each other.

18. The information processing system according to claim 17, wherein the simulation model is edited based on the behavior of the plurality of semiconductor manufacturing apparatuses.

19. The information processing system according to claim 18, wherein the base of the simulation model is edited to fit each semiconductor manufacturing apparatus by deep learning.

20. The information processing system according to claim 1, wherein the simulation result determination circuitry is configured to compare the physical sensor data and previously simulated virtual temperature sensor data at the same position, and determine whether the physical sensor data and the previously simulated virtual temperature sensor data at the same position are the same.

* * * * *